United States Patent
Onari et al.

[11] Patent Number: 6,132,391
[45] Date of Patent: Oct. 17, 2000

[54] PORTABLE POSITION DETECTOR AND POSITION MANAGEMENT SYSTEM

[75] Inventors: Mikihiko Onari, Tokyo; Yoshio Matsuoka, Kanagawa-ken; Akihiro Aoyama, Shizuoka-ken, all of Japan

[73] Assignee: JATCO Corporation, Shizuoka-ken, Japan

[21] Appl. No.: 09/221,606

[22] Filed: Dec. 29, 1998

[30] Foreign Application Priority Data

Dec. 30, 1997 [JP] Japan ................................. 9-367725

[51] Int. Cl.$^7$ .................................................. A16B 5/103
[52] U.S. Cl. .......................................... 600/595; 364/449
[58] Field of Search .................................. 600/587, 595; 364/364, 449, 561

[56] References Cited

U.S. PATENT DOCUMENTS

| | | | |
|---|---|---|---|
| 4,991,126 | 2/1991 | Reiter | 364/561 |
| 5,406,491 | 4/1995 | Lima | 364/449 |
| 5,583,776 | 12/1996 | Levi et al. | |

FOREIGN PATENT DOCUMENTS

| | | |
|---|---|---|
| 10038602 | of 0000 | Japan . |
| 2216011 | of 0000 | Japan . |
| 8068643 | of 0000 | Japan . |
| 2-216011 | 8/1990 | Japan . |
| 5-172579 | 7/1993 | Japan . |
| 8-68643 | 3/1996 | Japan . |
| 9-89584 | 4/1997 | Japan . |

OTHER PUBLICATIONS

UK Search Report dated Aug. 6, 1999.

*Primary Examiner*—Max Hindenburg
*Assistant Examiner*—Pamela Wingood
*Attorney, Agent, or Firm*—Blank Rome Comisky & McCauley LLP

[57] ABSTRACT

A portable position detector and a position management system that are capable of accurately detecting the direction of a walking body even when GPS signals cannot be received (or without reception) and thereby enhancing the accuracy of the dead reckoned position of the walking body.

The portable position detector is equipped with a pedometer and a geomagnetic sensor. With the pedometer, the moved distance of a walker is detected by a calculation of "the number of steps×the length of a step". The moved direction is detected with the geomagnetic sensor. With this, the moved position of the walker is accurately detected by the self-contained navigation system. Particularly, even in the case where the position detector is located in a forest or between buildings where a signal cannot be received from a global positioning system (GPS) due to high buildings, banks, and forests, the position detector with a portable size and weight applicable to a walker can know with a practically sufficient degree of accuracy the position of a person carrying this portable detector by the self-contained navigation system.

13 Claims, 17 Drawing Sheets

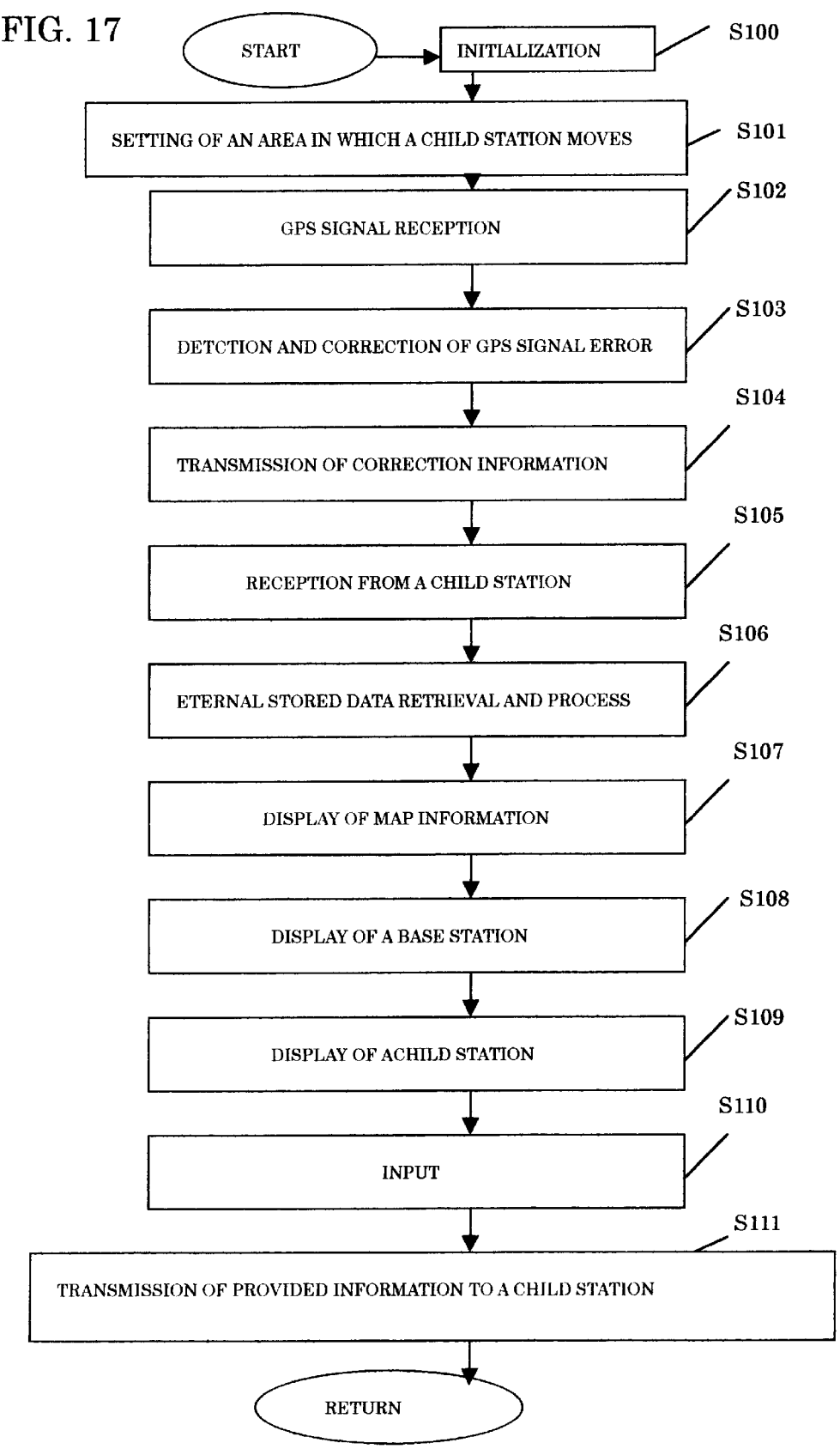

PORTABLE POSITION DETECTOR AND POSITION MANAGEMENT SYSTEM

FIELD OF THE INVENTION

This invention relates generally to a portable position detector and a position management system, and more particularly to a portable position detector capable of estimating the moved position of a walking body (e.g., a person) by a self-contained navigation system and a position management system capable of managing the positions of a plurality of portable position detectors.

DESCRIPTION OF THE RELATED ART

A variety of vehicle navigational systems have been developed. At the beginning, a self-contained navigation system was used to provide information about the location of a vehicle. Later, hybrid systems have been developed in which a self-contained navigation system and a global positioning system (GPS) are used. The self-contained navigation system employs an integration system. That is, the outputs from a speed sensor are integrated to detect the traveled distance of a vehicle, and the direction of the vehicle is detected from a direction sensor such as a gyro. The direction detected for each predetermined distance or time and the distance traveled during each time period are cumulated to detect the current position.

On the other hand, a portable position detector that utilizes the GPS has recently been developed in order to render it possible to measure the position of a walker. However, in the GPS, the calculation of the position cannot be performed unless information is received from 4 satellites (or 3 satellites although measurement accuracy is reduced). In the case of the portable position detector, a walker walks on mountains and valleys and, even in a city, walks on a sidewalk, that is easily shaded by buildings. As a result, the portable position detector is considerably disadvantageous in the above-mentioned reception, compared with vehicle navigational systems. In addition, a speed sensor cannot be simply applied to a walker, as in vehicle navigational systems.

Hence, the self-contained navigation system principles for walkers, which employ a pedometer, have hitherto been proposed in Japanese Laid-Open Patent Publication Nos. HEI 2-216011, HEI 5-172579, HEI 8-68643, and HEI 9-89584. The pedometer is used to calculate a moved distance by "the number of steps×the length of a step". Based on the calculated distance and the direction measured with a direction sensor, the location of a walker is determined.

However, the above-mentioned conventional methods have the following disadvantages when measuring the position of a walker. That is, the direction of a walker can be always detected at any point, while a pedometer can detect only whether or not a single step of a walk has been made. For example, the pedometer cannot continuously detected the moved distance of the center of gravity of a walker's body, which is (continuously moved during a single step. Therefore, unlike vehicle navigational systems, at what point a moved distance and a moved direction are detected and used as a base of the calculation of the position of a walker is considerably important for the position detection of a walker based upon a self-contained navigation system, because particularly in a walk on a corner, the direction of the body easily changes even during movement of a single step.

In the above-mentioned 4 publications, Japanese Laid-Open Patent Publication No. HEI 9-09584 has no description of how a moved distance and a moved direction are determined.

On the other hand, Japanese Laid-Open Patent Publication No. HEI 8-68643 discloses that when a cantilever vibration meter (pedometer) with a weight outputs a pulse signal, the direction at that time is employed to calculate a moved distance. However, in this vibration meter (pedometer), by the vertical movement of the center of gravity of a walker, a pulse signal is generated when the case of the vibration meter strikes on the weight that tries to keep its position by inertia. Note that all pedometers are uniformly set so that a pulse signal is generated when the aforementioned gravity of center rises by a predetermined distance (about 15 mm). Also, since there is a great shock when a walker lands on a road, the output of the vibration meter gives rise to hunting and therefore the electric circuit cuts this (i.e., a signal at the time of landing is not used). Therefore, if a moved direction is detected at the time of the generation of this output pulse, the moved direction will often be detected when a walker begins to change a direction. As a result, it cannot be expected to select an optimal moved direction, and a measured position is often departed from the actual position.

Japanese Laid-Open Patent Publication Nos. HEI 2-216011 and HEI 5-172579 disclose that the direction of a walker is constantly detected and that it is judged whether the direction has been changed. If it is judged that the direction has been changed, the direction and distance up to this point are stored in order. As occasion demands, a position and a walked route are calculated from the stored data. This method judges a change in a moved direction by whether or not a measured direction has exceeded a reference direction range that is a predetermined direction change. However, when a measured direction exceeds the reference (direction range, there is no description of which direction of the moved directions being changed up to that time within the reference direction range is employed in the measurement of a position.

In the aforementioned case, if the range of a reference value is narrow, a direction will constantly be changed and therefore the operation will become complicated. At the same time, the storage capacity will become too large, so that the reference value range must be set wide to some degree. If the range is set wide, dispersion will become increasingly great, depending on the direction used before direction change. Particularly, in a long and gentle corner or an inclined road, an error is cumulated.

SUMMARY OF THE INVENTION

It is an object of the present invention to provide a portable position detector and a position management system that are capable of accurately detecting the direction of a walking body even when GPS signals cannot be received (or without reception) and thereby enhancing the accuracy of the dead reckoned position of the walking body.

To achieve this end and in accordance with a first preferred form of the present invention, there is provided a portable position detector for detecting a moved position of a walking body. The portable position detector is constructed of (1) walking-motion detection means for measuring a value related to a walking motion caused by movement of the walking body, (2) moved-distance estimation means for estimating a moved distance, based on an output of the walking-motion detection means, (3) moved-direction detection means for detecting a direction of the walking body or a direction of the movement caused by movement of walking of the walking body, (4) moved-direction determination means for detecting points at which the body of said walking body arrives at substantially a highest position and/or lands by walking, based on said value measured by said walking-motion detection means, and also for determining a moved direction at a specific point as a specific moved direction, the specific point being related to at least one of said detected two points and also being specified in a range in which said body is between said highest-position arrival point and a highest-position arrival point that is obtained by the next walking step, and (5) moved-position estimation means for estimating a position of the walking body after movement, based on the moved distance of the walking body estimated by the moved-distance estimation means and the specific moved direction determined by the moved-direction determination means.

Thus, the walking-motion detection means can easily grasp the highest-position arrival point and/or landed point of the body of a walker by the output patterns of a geomagnetic sensor and an acceleration sensor. For the moved direction of the walker, the direction of the body at a point in a range, in which the walker lands from the high-position arrival point and then raises the next foot to the highest position, is closer to the moved direction than the direction of the body at a point at which the walker begins to raise the foot thereof. Therefore, if one of the aforementioned two points is grasped, then an optimal specific point in the aforementioned range can be selected at the one point or a point delayed from the one point by a predetermined time period (i.e., a point related to the aforementioned point) As a result, a more superior moved direction could be selected.

In accordance with the aforementioned first preferred form of the present invention, even in the case where the position detector is located in a forest or between buildings where a signal cannot be received from a global positioning system (GPS) due to high buildings, banks, and forests, the position detector with a portable size and weight applicable to a walker can know the position of a person carrying this portable detector by a self-contained navigation system. In this case, when the moved direction of the body of a walker required for measurement is determined, easy detection becomes possible by grasping the highest-position arrival point or landed point of a body, such a foot or a waist, with a geomagnetic sensor or an acceleration sensor. With this, the moved direction at a point, which is in the range between the highest-position arrival point related to the aforementioned point (or a point delayed from the aforementioned point by a predetermined point) and the next highest-position arrival point, is used as a specific moved direction for measurement. As a result, a moved direction can be determined at a point in which the direction of the body of a walker gets closer to the actual direction. With this, an enhancement in the measurement accuracy becomes easily possible.

In addition, by detecting changing environment, the length of a step can be changed according to a slopping road, etc. As a result, position accuracy can be further enhanced. Furthermore, the position detector according to the present invention can be produced at low cost.

In a second preferred form of the present invention, the moved-distance estimation means counts the number of steps, based on a vertical acceleration of the walking body detected by the walking-motion detection means, and also estimates a moved distance from a relation of the counted number of steps and the length of a step.

In accordance with the aforementioned second preferred form of the present invention, the moved-distance estimation means counts the number of steps, based on a vertical acceleration change of the walking body detected by the walking-motion detection means. Therefore, the moved-distance estimation means can estimate a moved distance by multiplying the counted number of steps and the length of the corresponding step. As a result, the self-contained navigation system becomes possible with a portable and small position detector.

In a third preferred form of the present invention, the moved-distance estimation means counts the number of steps on the basis of a vertical geomagnetic change caused by walking of the walking body, detected by the walking-motion detection means, and also estimates a moved distance from a relation of the counted number of steps and the Length of a step.

In accordance with the aforementioned third preferred form of the present invention, the moved-distance estimation means counts the number of steps, based on a vertical geomagnetic change of the walking body detected by the walking-motion detection means. Therefore, the moved-distance estimation moans can estimate a moved distance by multiplying the counted number of steps and the length of the corresponding step. As a result, the self-contained navigation system becomes possible with a portable and small position detector.

In a fourth preferred form of the present invention, the moved-direction determination means judges and detects the highest-position arrival point and/or the landed point from a vertical acceleration change caused by walking of the walking body, and also determines a moved direction of the walking body at a specific point as a specific moved direction. The specific point is at least one of the two points, or is a point delayed from the one point by a predetermined Lime period. This is, the walking-motion detection means in this embodiment employs an acceleration sensor.

In accordance with the aforementioned fourth preferred form of the present invention, the highest-position arrival point and/or the landed point of the body of a walker can be detected by employing an acceleration sensor. The specific point is determined as the detected point or a point delayed from one of the two points by a predetermined time period. This specific point can be set to a point at which the moved direction of the body of a walker becomes closer to the actual direction after the moved direction has changed considerably (as described above, a point in a range in which the body is point and a highest-position arrival point that is obtained by the next walking stop). As a result, measurement accuracy can be enhanced by simple detection.

In a fifth preferred form of the present invention, the moved-direction determination means judges and detects the highest-position arrival point and/or the landed point from the vertical geomagnetic change caused by walking of the walking body, and also determines a moved direction of the walking body at a specific point as a specific moved direction, the specific point being at least one of the two points, or being a point delayed from the one point by a predetermined time period. That is, the walking-motion detection means in this embodiment employs a geomagnetic sensor.

In accordance with the aforementioned fifth preferred form of the present invention, the highest-position arrival point and/or the landed point of the body of a walker can be detected by employing a geomagnetic sensor. The specific point is determined as the detected point or a point delayed from one of the two points by a predetermined time period. This specific point can be set to a point at which the moved direction of the body of a walker becomes closer to the actual direction after the moved direction has changed considerably (as described above, a point in a range in which the body is between the aforementioned highest-position arrival point and a highest-position arrival point that is obtained by the next walking step). As a result, measurement accuracy can be enhanced by simple detection.

In a sixth preferred form of the present invention, the predetermined time period that is delayed by the moved-direction determination means is determined as a proportional portion of a walking step period from a walking cycle.

In accordance with the aforementioned sixth preferred form of the present invention, the previous walking cycle is detected. Based on this walking cycle, the delay time period is calculated as a proportional portion of the walking step period which is a specific time such that an optimal direction is obtained. Therefore, even if the-state of walking changed, an optimal specific point can be kept.

In a seventh preferred form of the present invention, the predetermined time period that is delayed by the moved-direction determination means is set to a time period during which the specific point goes to a state in which a landed foot and the next foot are positioned side by side. At the point at which a landed foot and the next foot are positioned side by side, the direction of the body of a walker is often closest to the direction caused by a single step of a walk. The setting of the time period may be previously performed, or the time period may be set as a proportional portion of a walking step period.

In accordance with the aforementioned seventh preferred form of the present invention, the delay time period is set to a time period during which the specific point goes to a state in which a landed foot and the next foot are positioned side by side. Therefore, the specific direction for calculating a measured position often becomes closest to a moved direction. As a result, measurement accuracy can be enhanced.

In an eighth preferred form of the present invention, the moved-distance estimation means detects changing environment from acceleration change or geomagnetic change caused by movement of the body, also changes the length of a step, based on the detected changing environment, and calculates the estimated distance. The changing environment includes a downward slope, an upward slope, etc. The changing environment is detected by the pattern of the acceleration change or geomagnetic change.

In accordance with the aforementioned eighth preferred form of the present invention, the moved-distance estimation means is constructed so that it can detect changing environment, such as an upward slope or a downward slope, from acceleration change or geomagnetic change caused by the movement of the body of a walker. Therefore, the length of a step for calculation of a moved distance can be changed according to changing environment, whereby measurement accuracy is enhanced.

In a ninth preferred form of the present invention, correction of the step length is performed by making the step length shorter than a step length during a walk on a level path, when it is judged by the detection of the changing environment that a walking path has a slope greater than a predetermined value.

In accordance with the aforementioned ninth preferred form of the present invention, the correction of the step length can be performed by making the step length shorter than a step length during a walk on a level path, when it is judged that a walking path has a slope greater than a predetermined value. Therefore, a position on a X-Y plane viewed from a vertical direction (Z-direction) can be made more accurate.

In a tenth preferred form of the present invention, the portable position detector further comprises a unit for receiving radio waves from global positioning system (GPS) satellites and measuring the current position of the walking body, and position correction means for correcting the current position estimated by the position estimation means, when the current position is measured with the unit.

In accordance with the aforementioned tenth preferred form of the present invention, a unit for receiving radio waves from global positioning system (GPS) satellites is provided. Therefore, in the place where GPS signals can be received, the position based on the GPS signals is used. On the other hand, in the place where GPS signals cannot be received, a dead reckoned position is used. With this, a position can be measured at all times. An error in the dead reckoned position can be cancelled by the measured position based on the GPS signals, whereby measurement accuracy is also assured.

In an eleventh preferred form of the present invention, when the moved direction detected by the moved-direction detection means or the specific moved direction determined by the moved-direction determination means is within a predetermined direction width and also when it is judged by the detection of the changing environment that the cumulated number of steps or the cumulated moved-distance, in which a vertical amount of movement is within a predetermined width, is a straight-advance walk on a level path which continues for a predetermined time period or more, the correction of the length of a step in the moved-distance estimation means is performed by a value obtained by dividing a calculated distance by the cumulated number of steps. The calculated distance is calculated from both a starting point of the straight-advance walk on a level path and the current position at an end point of the walk measured by the unit.

In accordance with the aforementioned eleventh preferred form of the present invention, only when walking is substantially a straight-advance walk on a level path which continues for a predetermined time period or more, the correction of the length of a step is performed by a value obtained by dividing the aforementioned calculated distance by the cumulated number of steps. Therefore, the step length can be set to an optimal step length. Since the distance calculated with GPS signals is a straight-line distance, the calculation is performed under a condition that walking is substantially a straight-advance walk on a level path and a condition that walking continues for a predetermined time period or more in consideration of an error in the measurement and a change in the step length. As a result, an enhancement in the measurement accuracy can be expected.

A position management system according to the present invention is equipped with a portable position detector for detecting a moved position of a walking body. The portable position detector includes (1) walking-motion detection means for measuring a value related to a walking motion caused by movement of the walking body, (2) moved-distance estimation means for estimating a moved distance, based on an output of the walking-motion detection means, (3) moved-direction detection means for detecting a direction of the walking body or a direction of the movement caused by movement of walking of the walking body, (4) moved-direction determination means for detecting points at which the body of said walking body arrives at substantially a highest position and/or lands by walking, based on said value measured by said walking-motion detection means, and also for determining a moved direction at a specific point as a specific moved direction, the specific point being related to at least one of said detected two points and also being specified in a range in which said body is between said highest-position arrival point and a highest-position arrival point that is obtained by the next walking step, (5) moved-position estimation means for estimating a position of the walking body after movement, based on the moved distance of the walking body estimated by the moved-distance estimation means and the specific moved direction determined by the moved-direction determination means, and (6) transmission means for transmitting at least one piece of information of output information from the walking-motion detection means, from the moved-distance estimation means, from the moved-direction determination means, and from the moved-position estimation means. The position management system is further equipped with a base station. The base station includes (1) reception means for receiving the output information transmitted by the transmission means of the portable position detector and (2) display means for displaying a moved position of the portable position detector, based on the information from the reception means.

In accordance with the aforementioned position management system of the present invention, the aforementioned portable position detector (child station) is provided with transmission means to transmit position information to the base station (parent station). Therefore, the base station can grasp and manage the positions of respective child stations.

In the position management system, at least a portion of information necessary for a process of calculating a position of the portable position detector on the basis of a GPS signal received by the portable position detector may be transmitted from the portable position detector to the base station. The base station may receive the portion of information and calculate the position. In the portable position detector, a calculation process may be shared with the portable position detector and the base station so that the base station executes processes other than the position calculation process.

In accordance with the aforementioned position management system, a portion of the information obtained by the child station is transmitted to the base station by the transmission means. With this, the calculation process is shared with the portable position detector and the base station so that the base station executes processes other than the calculation process. Therefore, the child station becomes structurally simple. Of course, the calculation result in the base station can be transmitted to the child station so that the child station can utilize it.

BRIEF DESCRIPTION OF THE DRAWINGS

The above and other objects and advantages will become apparent from the following detailed description when read in conjunction with the accompanying drawings wherein:

FIG. 17 is a flowchart showing the control program of the base station.

DETAILED DESCRIPTION OF THE PREFERRED EMBODIMENTS

Embodiments of the present invention, applied to a portable position detector that is used by individuals, will hereinafter be described in reference to the drawings.

Figure 1:
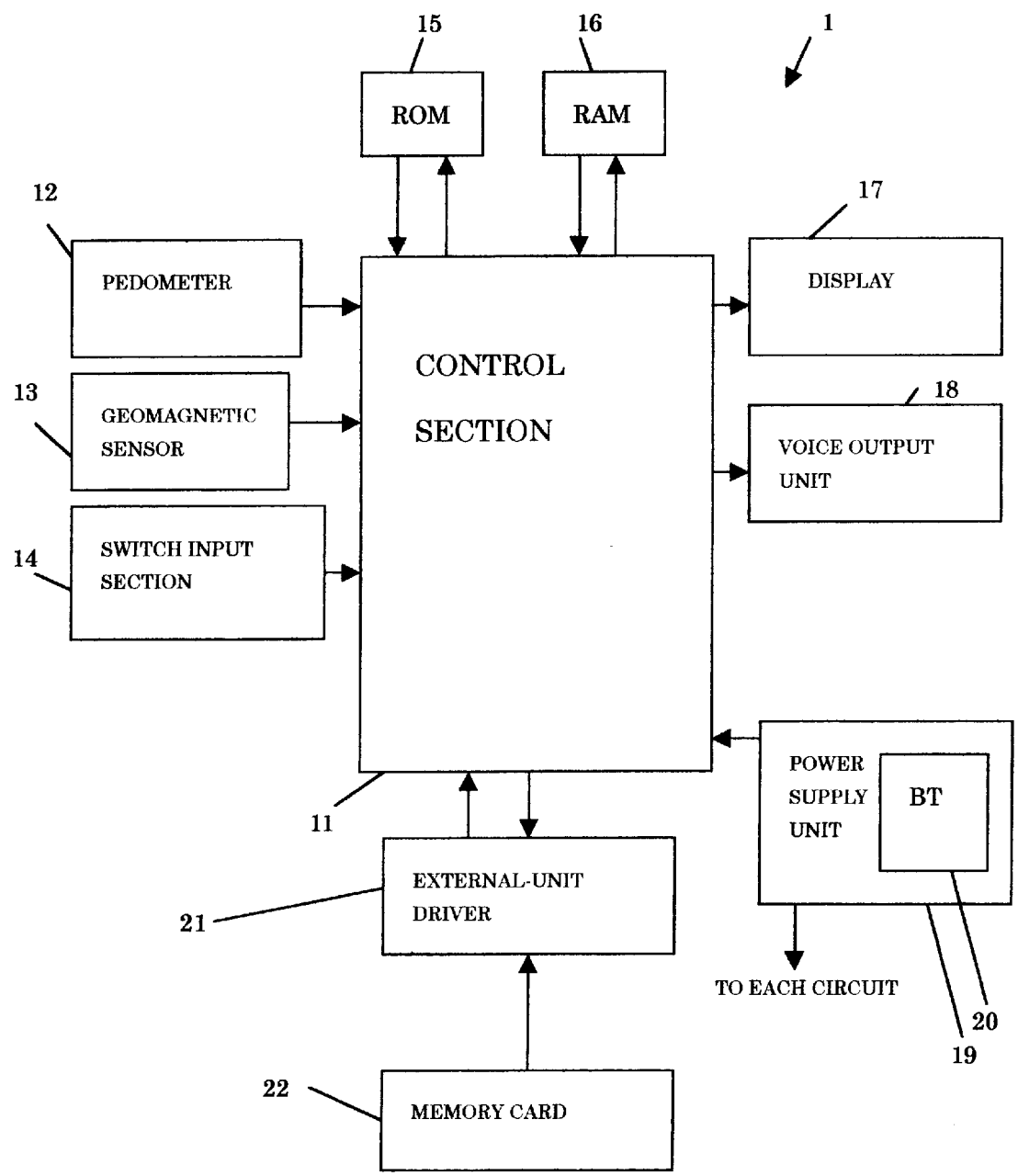
FIG. 1 is a block diagram of a portable position detector according to a first embodiment of the present invention.

FIG. 1 shows a portable position detector constructed according to a first embodiment of the present invention. This embodiment is applied to a walking body such as a person.

In the figure, reference numeral 1 denotes a portable position detector. The portable position detector 1 is roughly constructed of a control section 11, a pedometer 12, a geomagnetic sensor 13, a switch input section 14, a read-only memory (ROM) 15, a random access memory (RAM) 16, a display 17, a voice output unit (e.g., speaker) 18, and a power supply circuit (not shown) 19. The power supply circuit 19 is added as occasion demands. This is also true of other embodiments to be described later. The portable position detector 1 is further constructed of an incorporated battery 20 and an external-unit driver 21.

Figure 2:
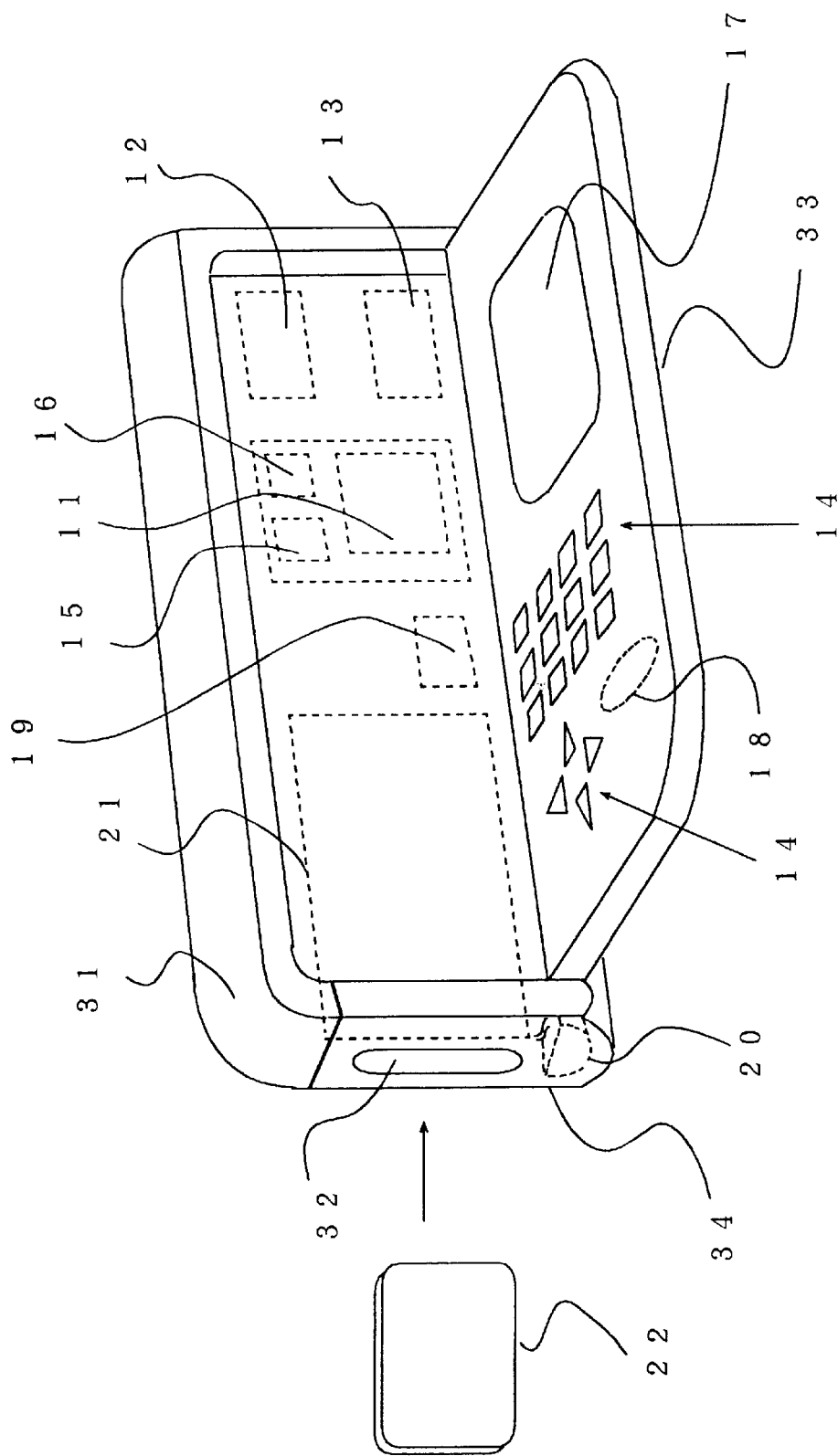
FIG. 2 is a perspective view showing the portable position detector.

The pedometer 12 (walking-motion detection means) detects the number of steps that a person walks. The pedometer 12 uses, for example, a pedometer that electrically detects mechanical motion by using a weight or an electronic pedometer that incorporates a coil or a magnetic sensor. The electronic pedometer has a pulse amplification circuit and a counter, and cumulates as the number of steps the pulses generated with the electromagnetic induction of the coil (or magnetic sensor) and geomagnetism by walking or traveling. The pedometer 12 is small in size and light in weight and is housed and arranged interiorly of the main body 31 of the portable detector 1, as shown in FIG. 2.

Note that the pedometer 12 may use, for example, a sensor element of the solid state type in which a stress element is provided on a thin-film cantilever formed on a silicon substrate. The change of the electric characteristic value of the stress element is compared with a reference level to generate a pulse signal. In this case there is an advantage that subminiaturization is achievable and also digital output is easily obtainable. Also, the pedometer 12 may be a type in which an accelerator electrically detects the motion of the body of a walker. The output signal of the accelerator is converted to electrical pulses corresponding to a specific motion of the body, and these converted pulses are counted. Furthermore, the pedometer 12 may use other small and light types in which digital output is obtained. For example, the pedometer 12 may use a component called an accelerator sensor or a geomagnetic sensor.

In short, any principle may be employed if it can electrically detect that a single step of a walking motion has been performed.

Moreover, the pedometer 12 may use a commercially available pedometer separately provided. In this case, the output signal of the separately provided pedometer is input to the control section 11 via a cable and a connector.

The control section 11 performs a process of measuring a value (here, the number of steps) related to the motion caused by movement of a person on the basis of a signal from the pedometer 12 and estimating a moved distance, in accordance with a program stored in the ROM 15. The estimation of the moved distance is performed by a calculation of (the number of steps)×(the length of a step). Therefore, the pedometer 12, control section 11, ROM 15, and RAM 16 constitute moved-distance estimation means, moved-direction determination means, and moved-position estimation means.

The geomagnetic sensor 13 detects the direction of movement (moved direction) of a person. The geometric sensor 13 uses a small and light magnetic sensor that detects the magnetic field of the earth to detect which direction the sensor itself points to with respect to the east-west and north-south directions. As such a sensor, the geomagnetic sensor 13 employs, for example, a digital 3-axis magnetic sensor HMR2300 (trade name) manufactured by Honeywell. The geomagnetic sensor 13 constitutes moved-direction detection means for detecting a moved direction caused by movement of a person. The moved-direction detection means is not limited to a geomagnetic sensor. For example, a gyrocompass and other sensors may be used if they are small in size and light in weight.

The geomagnetic sensor 13 can also detect a vertical change in the geomagnetism caused by the walking of a person, so this geomagnetic change can judge regularities, a highest-position arrival point of the body of a person from a lowest value which continues for a predetermined time period, and a landed point. At this point or, as described later, at a point delayed from one of these points by a set time, the moved-direction determination means determines the moved direction at this point as a specific moved direction. Thus, the geomagnetic sensor 13 constitutes part of the moved-direction determination means.

The switch input section 14 includes a manipulation key for performing the manipulation of the portable position detector 1, and a control key for performing the setting of a destination, a route, area change and the like on the map information displayed on the screen of the display 17. The switch input section 14 also includes an area change key consisting of page-up and page-down keys for moving a map area on the screen of the display 17 in a vertical direction. The switch input section 14 further includes various switches necessary for manipulation (e.g., a ten-key pad capable of inputting numerical characters, a power switch, and a memory key). In accordance with a predetermined spot (e.g., a destination spot) that a person tries to move to, the switch input section 14 is used for specifying the coordinate position of that spot on a map as a point, also specifying any of the surrounding directions represented in east-west and south-north during movement in order to obtain the map information about the specified direction, and furthermore, performing the resetting of the starting point (including a reset operation).

The control section 11 receives a walk signal from the pedometer 12 that detects the walking of a person at every step. The control section 11 employs the received walk signal in the calculation of a moved distance, making a previously set step length value correspond to each step. The control section 11 also receives a direction signal representing which of east-west and south-north directions the body of a walker points to, detected with the geomagnetic sensor 13. Furthermore, the control section 11 detects the vertical change of the body of a walker and accordingly the state of the up-and-down motion of the foot from the vertical change in geomagnetism detected with this geomagnetic sensor 13. Then, when the control section 11 detects that the walking state (up-and-down motion of a body or a foot) has gone to a predetermined state, the control section 11 determines the direction of the aforementioned body at this point as the moved direction. The predetermined state means that the walking state is in a range between the highest-position arrival point (of a point at which a body such as a foot or a waist reaches substantially the highest position, a landed point, or a point delayed from one of the two points by a predetermined point) and the high-position arrival point of the next foot, etc. Therefore, the control section 11 calculates the movement of a position caused by the current one step from the determined length and direction of the current one step and adds the calculated movement to the previous position, thereby determining the current position.

Note that while the length of a step employed in the aforementioned calculation employs the previously input numeric value of the length of a step as a user normally walks on a level path, the numeric value may be changed according to environment and walking conditions (e.g., during an uphill road) to be described later. Furthermore, the control section 11 displays the thus-obtained moved-position information on the display 17 and performs a calculation process necessary for outputting voice information necessary for the voice output unit 18. Moreover, the control section 11 displays a map on the screen of the display 17 and controls it, based on information (e.g., map information about a moving route, etc.) from the memory card 22 which is input via the external-unit driver 21. The control section 11 is constructed of a microcomputer including a central processing unit (CPU), and controls the aforementioned control in accordance with a control program stored in the ROM 15 (see flowcharts to be described later).

The display 17 displays information relevant to the position of a person estimated by the control section 11 and therefore constitutes display means. The display 17 uses, for example, a small liquid crystal display of a low dissipation power type (which may be either monochromatic or color) . The voice output unit 18 gives a voice-synthesized sound, based on a voice-synthesized signal from the control section 11, and consists, for example, of a speaker. This speaker is constructed so that it can provide information Lo a walker even when a cover portion 33 is not opened.

The external-unit driver 21 consists, for example, of a PCMCIA control circuit and performs the process of transmitting data between it and the memory card 22. The memory card 22 stores map information relevant to the moving route of a person and constitutes map-information storage means.

The ROM 15 has previously stored various programs and necessary data for the position calculation process that is performed by the control section 11. The RAM 16 has a first memory area that temporarily stores information input by the switch input section 14, a second memory area that temporarily stores destination information and the like specified by manipulation of the switch input section 14, a work area, and so on.

Reference 20 denotes an incorporated battery, which supplies necessary power to each of the above-mentioned circuits. Note that a power supply circuit 19 for changing voltage, etc. may be added as occasion demands.

FIG. 2 illustrates the construction of the portable position detector 1. In the figure, the portable position detector 1 has a main body 31. The main body 31 is small in size and light in weight and is formed into approximately a box so that a person can easily carry it. On the front face of the main body 31, the display 17 with a rectangular screen, the switch input section 14, and the voice output unit 18 are disposed. The interior of the main body 31 is incorporated with the control section 11, which is in turn equipped with the pedometer 12, geomagnetic sensor 13, external-unit driver 21 for a memory card, ROM 15, and RAM 16. Voltage is supplied from the battery 20 incorporated in the lower portion of the main body 31.

The left portion of the main body 31 is provided with a closable cover 34, and an insertion port 32 for the memory card 22 and an insertion port for the battery 20 are formed inside the closable cover 34. With this, the replacement of the incorporated battery 20, the inspection of the external-unit driver 21 and the like become easy.

It is preferable that the portable position detector 1 be fixed to a person, for example, a waist belt so that it is not displaced with respect to the body. For that reason, a belt anchoring member attachable to a waist belt is provided on the back surface of the main body 31, although not shown. This renders it possible to easily remove the portable position detector 1 from a waist belt and also to easily attach.

Now, the operation will be described.

Figure 3:
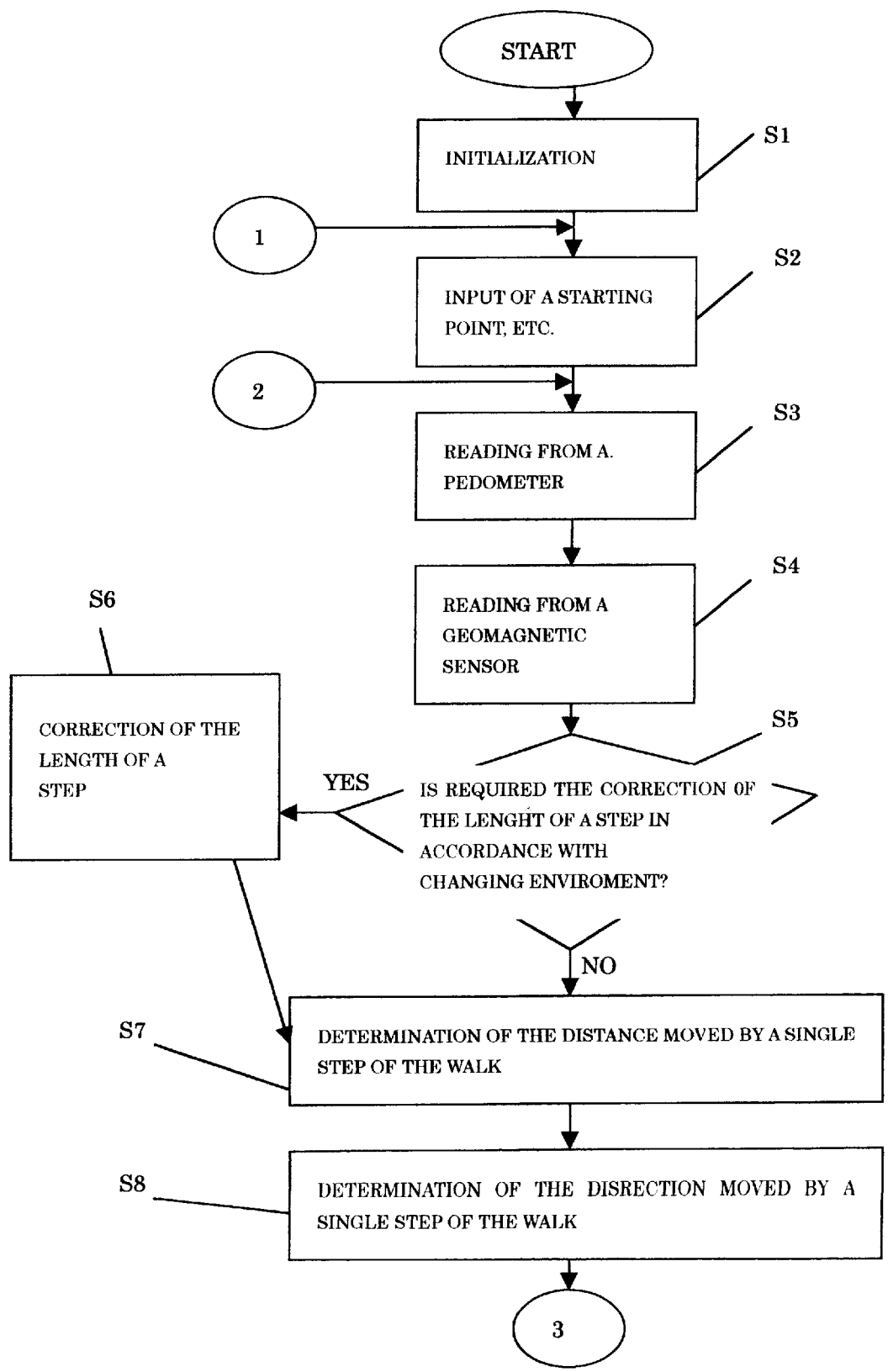
FIG. 3 is a flowchart showing the control program of the portable position detector.
Figure 4:
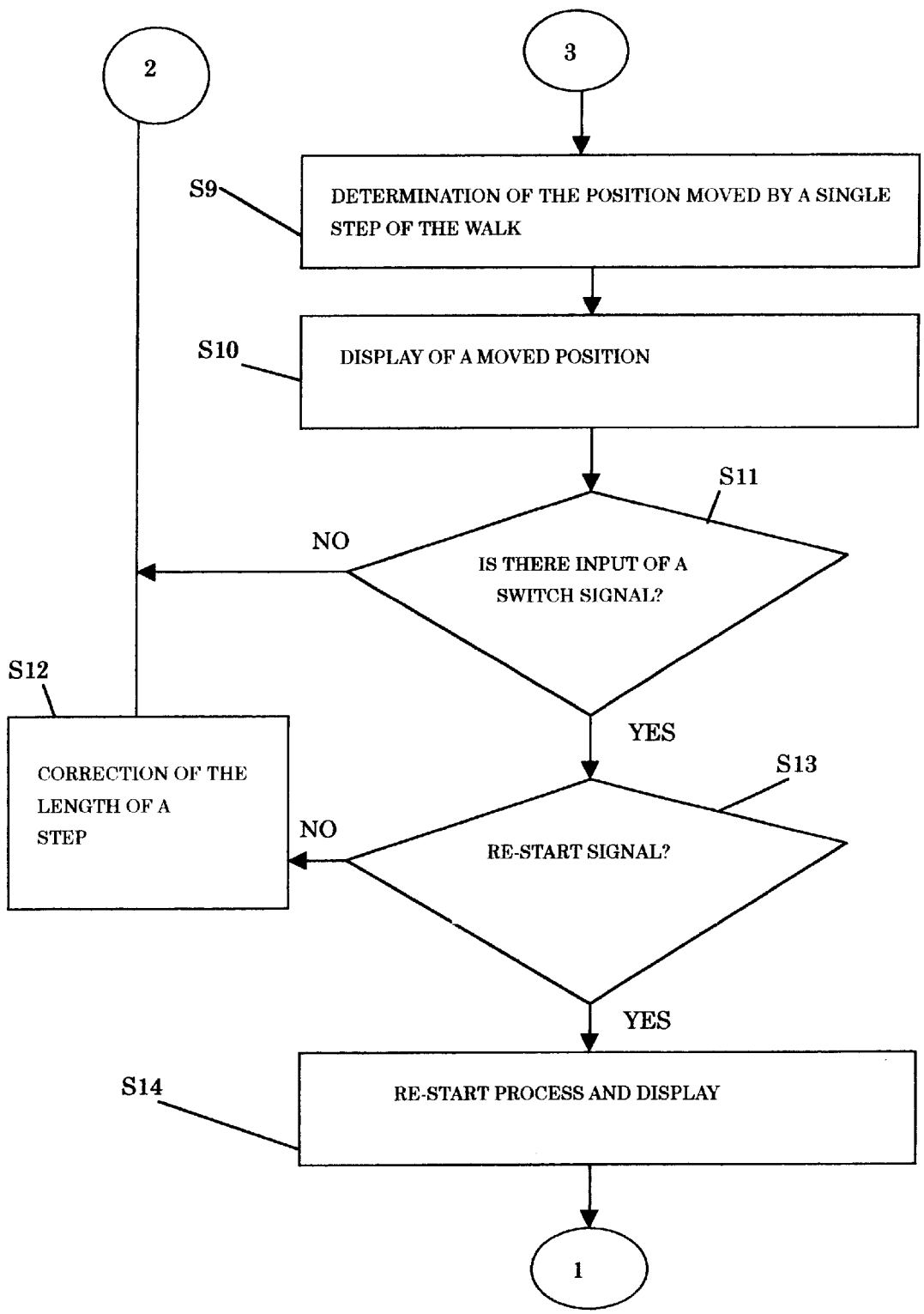
FIG. 4 is a flowchart showing the control program of the portable position detector.

FIGS. 3 and 4 are flowcharts showing the control program of the portable position detector 1.

The control program will be executed if power to the portable position detector 1 is turned on. If the control program starts, initialization will first be performed. In the initialization, the portable position detector 1 is automatically reset and a predetermined initialization process, such as the clearing of the work area of the RAM 16 and the like, is performed.

In step S3, input is performed. That is, a person carrying the portable position detector 1 manually inputs a starting point of movement, an average length of a step during a walk on a level path, and so on. At this time, for example, by displaying "Set a starting point for start of movement" on the screen of the display 17, a person is urged to perform initialization. Note that at this point, the memory card 22 (which stores map information about an area in which a walker moves, etc.) must have been inserted in the main body 31. In the case where the memory card 22 has not been inserted, a message that "Insert the memory card 22 for an area in which a walker moves, if necessary" may be displayed on the screen of the display 17.

The setting of the starting point of movement may be performed by specifying the starting point on a map as a point or by inputting the position coordinates (latitude and longitude). For example, as shown by an example of a moving route in FIG. 5(a), the starting point may be input as a point. Also, in initialization, the length of the step of a person is input. The input of the step length maybe performed by inputting figures with a ten-key pad, or may be automatically set by selecting the height of a person carrying the detector 1 from a range of grouped heights displayed on the screen of the display 17. This is based on the fact that the length of a step is generally related to the height of a person. It is a matter of course that the input of the step length may be performed by other methods.

Furthermore, in the initialization, the measurement of time is also started.

Next, in step S3 a signal from the pedometer 12 is input and in step S4 a signal from the geomagnetic sensor 13 is input. Next, in step S5 it is judged whether or not the correction of the length of a step is required according to changing environment. That is, depending upon changing environment, the length of a step will be influenced, for example, when a person goes up or down a sloping road or stairs. As a result, since the step length differs from an average step length during normal walking on a level path, a large error will occur in the moved length calculated based on the average step length. Hence, the length of a step can be changed according to detected changing environment. The detection of changing environment is performed by judging geomagnetic change corresponding to a sloping road, upstairs, downstairs and the like, based on a signal (Z-direction:height direction) from the geomagnetic sensor 13. In this case, the control section 11 advances to step S6 when there is present a slope greater than a predetermined value, and corrects the length of a step to less than a numeric value that is used during walking on a level path.

This correction may employ correction values grouped according to the magnitudes of slopes. In this case, since a map depicts a ground surface on a X-Y plane viewed from a vertical direction (Z-direction), generally in many cases it is preferable that the numeric value of the length of a step is corrected to a small value when there is a slop greater than a predetermined value.

In step S6, if the control section 11 ends the correction of a step length, it advances to step S7.

When, on the other hand, a slope is less than the above-mentioned predetermined value, the control section 11 advances to step S7 without correcting the length of a step.

Next, in step S7 a moved distance is calculated by the self-contained navigation system. That is, if a walk signal is input from the pedometer 12 at every step, the single step length (when a correction is made according to changing environment, the corrected step length) is regarded as the moved distance.

Next, in step S8, when the vertical (Z-axis) component of an output signal from the geomagnetic sensor 13 becomes a minimum value, the landed point is detected. Based on this detected point, the moved direction at the time of the walking is selected from among the direction signals being constantly output from the geomagnetic sensor 13 and is determined as a specific moved direction. Note that while this embodiment determines a landed point as a specific moved direction, the present invention is not limited to this. The specific moved direction may be substantially at a highest-position arrival point, or may be a point in a range between the highest-position arrive point of a point delayed from a landed point or a highest-position arrival point by a predetermined time period and the next highest-position arrival point. By selecting a moved direction at a point in this range, the moved direction can be made closer to the moved direction of the center of gravity of a person. The magnitude of the above-mentioned predetermined time period that is delayed may be set experimentally or set by the proportional portion of the walking step period calculated by the pedometer 12 or geomagnetic sensor 13.

Next, in step S9 the "moved position" by a single step of a walk is calculated from the aforementioned moved direction and moved distance determined at every step in the aforementioned manner. Then, by adding the current moved position to the position moved from the starting point, the position moved from the starting point, caused by the current walking, can be obtained.

Figure 5A:
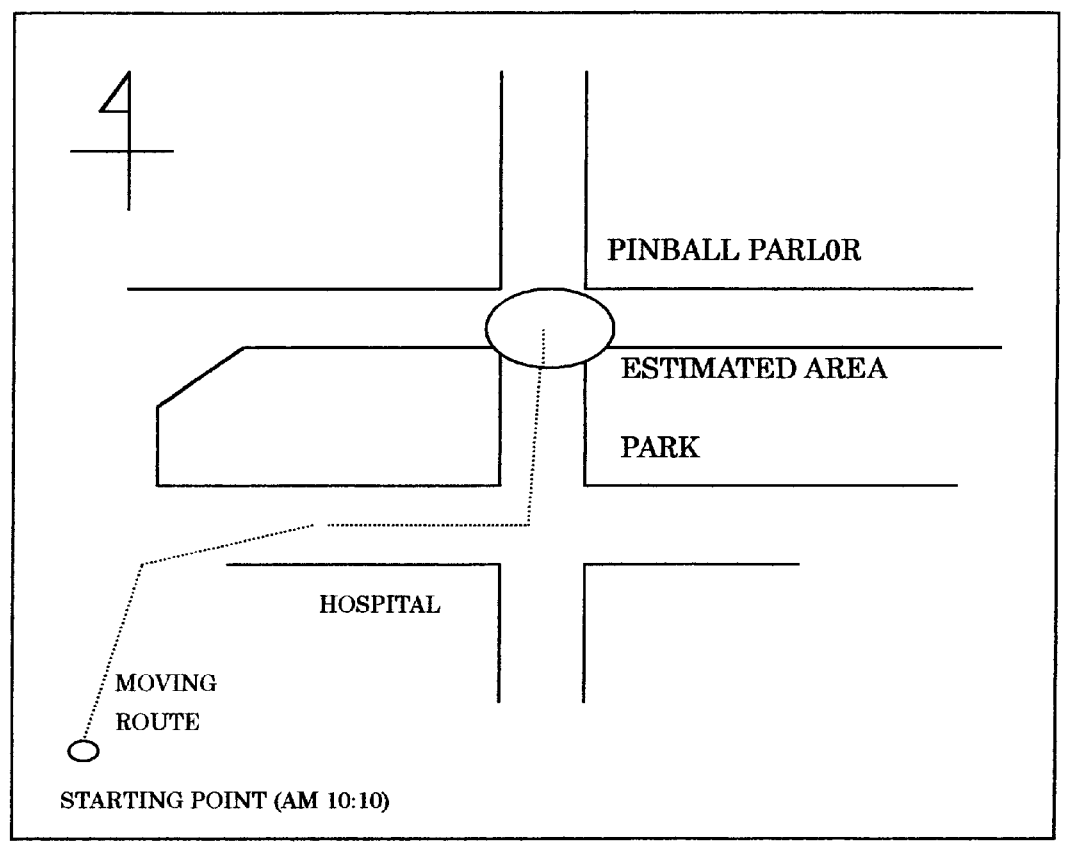
FIGS. 5A and 5B are diagrams used to explain the example of a moving route.
Figure 5B:
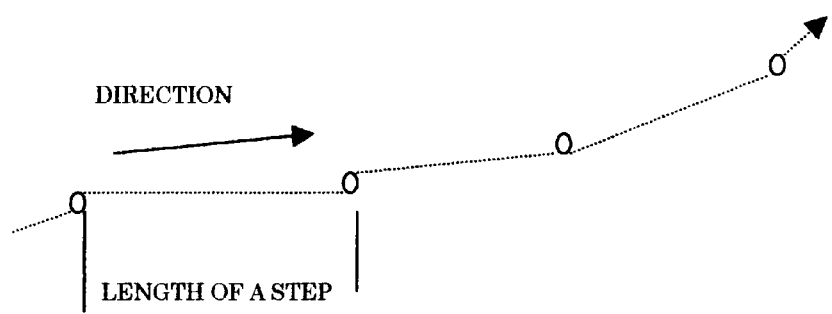

Next, in step S10 the determined moved position is, for example, displayed with points (○ marks) on the display 17, as shown in the enlargement of a locus of movement in FIG. 5A. At this time, map information corresponding to the current position of a person, road attribute information at that position (e.g., information about a national road, a prefectural road, etc.), and surrounding information at that position (e.g., main buildings, stations, etc.) are read from the memory card 22 and are displayed on the display 17 as shown in FIG. 5A. This enables a moving person to easily know which position on a map the person is at. At this time, an estimated position area is displayed as shown in FIG. 5A. Note that the estimated position area need not to be displayed.

In addition, in the aforementioned, when a new moved position is displayed, along with map information, attendant map information, such as the reference position, reference direction, and reduced scale (accordingly, a reference distance) of the map, has been simultaneously read in by the insertion of the memory card 22 in step S2, so this attendant information is also utilized.

Furthermore, at the stage this map information has been displayed, the current position may be guided with a voice-synthesized sound (e.g., "Turn left at the ○○ intersection about 10 m ahead") output from the voice output unit 18. Note that as a person advances further, the area of map information is automatically switched (i.e., the area is scrolled).

Next, in step S11 it is judged whether or not a switch signal (signal from the switch input section 14) has been input. If it has not been input, the control section 11 will return to step S3 and wait for the next signal from the pedometer 112. With this, a locus of movement will be displayed on the display 11 in accordance with the walking of a person, as shown in FIG. 5A.

On the other hand, if in step S11 the switch signal has been input, the control section 11 advances to step S13 and judges whether or not the switch signal is a re-start signal. If it is not a re-start signal even though it was mere screen display switching, the control section 11 advances to step S12 and performs an arithmetic process (e.g., a traveled distance cumulated from the starting point, etc.) and makes a display (e.g., a switch of a screen display, etc.) Furthermore, the control section 11 returns to step S3 and repeats processing.

If a switch input signal is an input signal to request scrolling of a map area of movement, the control section 11 receives this input signal to request scrolling, and a map area is scrolled and displayed on the display 17.

In step S13, when the switch signal is a re-start signal, the control section 11 advances to step S14 and performs a re-start process and a display thereof. Furthermore, the control section 11 returns to step S2 and makes re-input of a starting point and the like possible. Note that the re-start means the case where another route is set after the arrival of a destination or the case where a route up to now is erased although it is on the way to a destination and then a new route is reset.

Thus, even in the case where the position detector 1 according to the aforementioned embodiment is located in a forest or between buildings where a signal cannot be received from a global positioning system (GPS) due to high buildings, banks, and forests, the position detector 1 can know by the self-contained navigation system the position of a person carrying this position detector with a portable size and weight applicable to a walker. In this case, at a point in the range where a walker is between a highest-position arrival point and the next highest-position arrival point, a moved direction is determined with a geomagnetic sensor, and a moved position is calculated based on the determined direction. As a result, the moved direction becomes more accurate. Furthermore, the detection of the aforementioned point can easily judge whether it is highest-position arrival or landing by geomagnetic change (or acceleration change detected with a three-dimensional sensor instead of employing the geomagnetic sensor of the above-mentioned embodiment), and during this period, the aforementioned point can also be grasped by delaying a predetermined time period.

Moreover, by detecting changing environment, the length of a step can be changed during a slopping road, so that position accuracy can be further enhanced. It is a matter of course that the position detector according to the present invention can be produced at low cost.

Now, a second embodiment of the present invention will be described. The second embodiment corrects a moved position and, in some cases, the length of a step with a GPS satellite signal.

Figure 6:
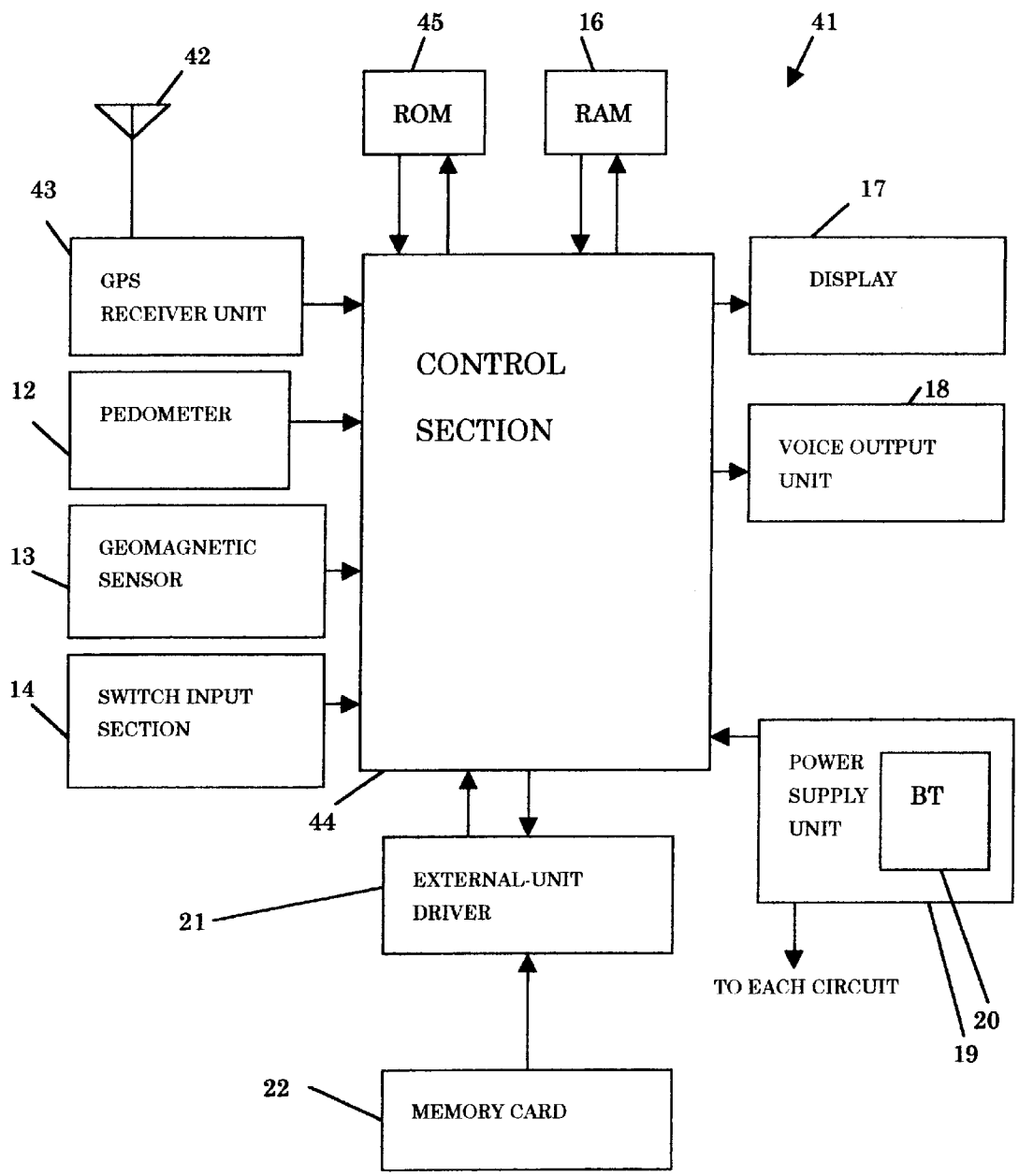
FIG. 6 is a block diagram of a portable position detector according to a second embodiment of the present invention.
Figure 7:
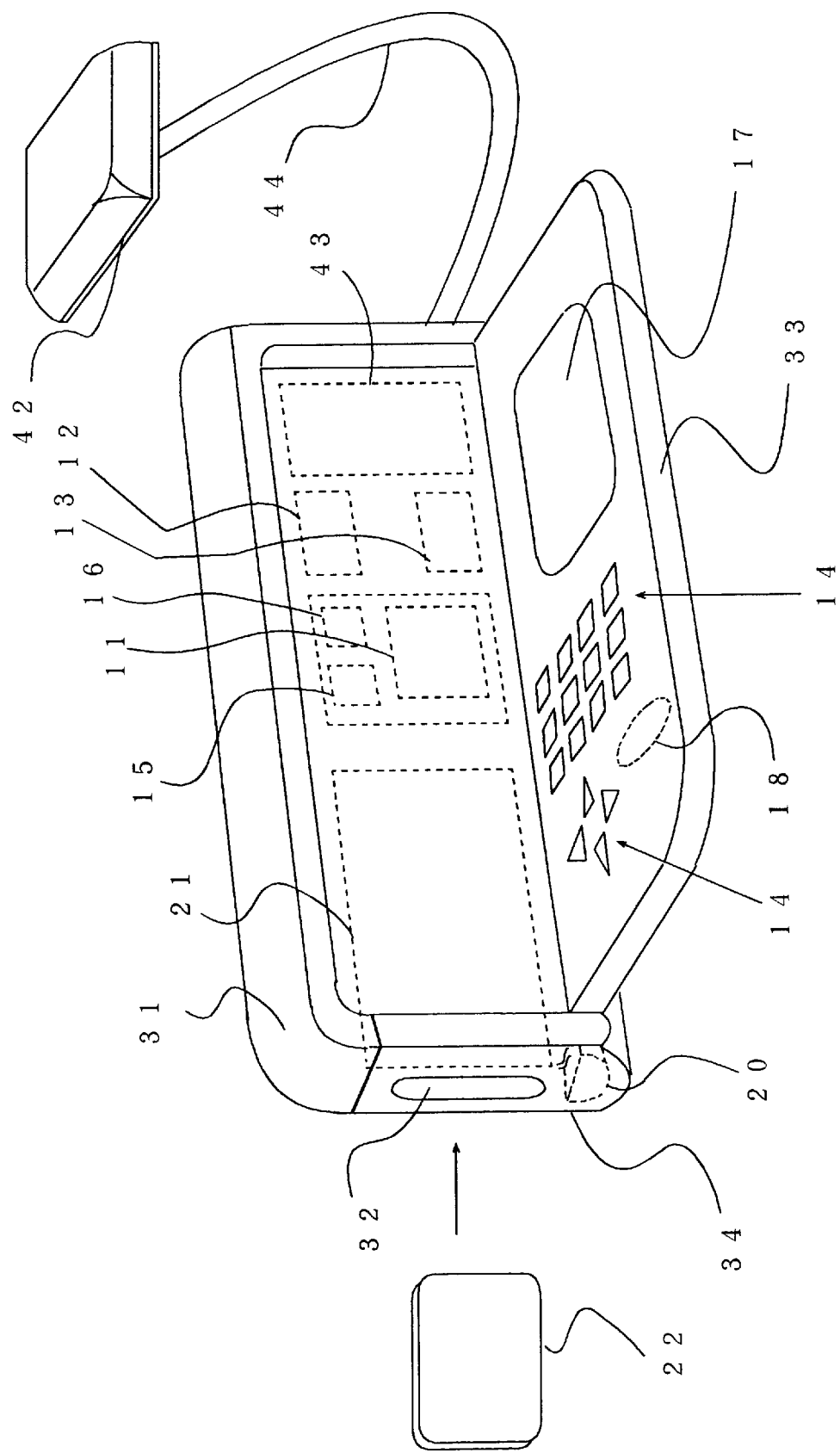
FIG. 7 is a perspective view showing the portable position detector according to the second embodiment of the present invention.

FIG. 6 shows a block diagram of a portable position detector 41 according to the second embodiment of the present invention, and FIG. 7 shows a perspective view of the portable position detector 41. In these figures, the portable position detector 41 differs from the first embodiment in that a GPS antenna 42 and a GPS receiver unit 43 are newly provided and that the contents of the control section 44 and the ROM 45 differ.

The GPS antenna 42 uses, for example, a micro strip patch antenna employing a teflon substrate and having hemispherical directivity, in order to receive a right-handed polarized wave signal of about 1.5 MHz sent from GPS satellites. The GPS antenna 42, as shown in FIG. 7, is attached above a main body 31, for example, onto the shoulder of a person carrying the portable position detector 41 and is connected to the GPS receiver unit 43 via a harness 44'.

The GPS receiver unit 43 receives and modulates a radio wave for measurement from a plurality of GPS satellites via the GPS antenna 42. The GPS receiver unit 43 also calculates the current position information (e.g., three-dimensional measurement information including latitude, longitude, and altitude) of the portable position detector 41 based on the modulated signal, and outputs the calculated current position information to the control section 44.

The GPS is constructed of 24 satellites respectively disposed four by four in 6 orbits. In principle the GPS receiver unit 43 receives radio waves from the satellites, also calculates a distance between a receiving point and the satellites from a difference between the arrival times, and finally calculates the three-dimensional positions (latitude, longitude, and altitude) of the receiving point. The GPS antenna 42 and the GPS receiver unit 43 constitute a GPS unit.

When the position information, measured and calculated with the GPS satellite signal, is obtained in addition to the position information obtained in the first embodiment, the control section 44 corrects the dead reckoned position with the position information obtained with the GPS satellite signal, in preference to the dead reckoned position. Also, by measuring and calculating an average step length in an interval during which the straight walking of a walker on a level path has been judged to continue, a previously set step length can be corrected to correspond to the actual step length. As a result, the accuracy of a moved position can be further enhanced. The control section 44, ROM 45, and RAM 16 function as position correction means and step length correction means in addition to the function of the first embodiment.

Now, the operation of the second embodiment will be described.

Figure 8:
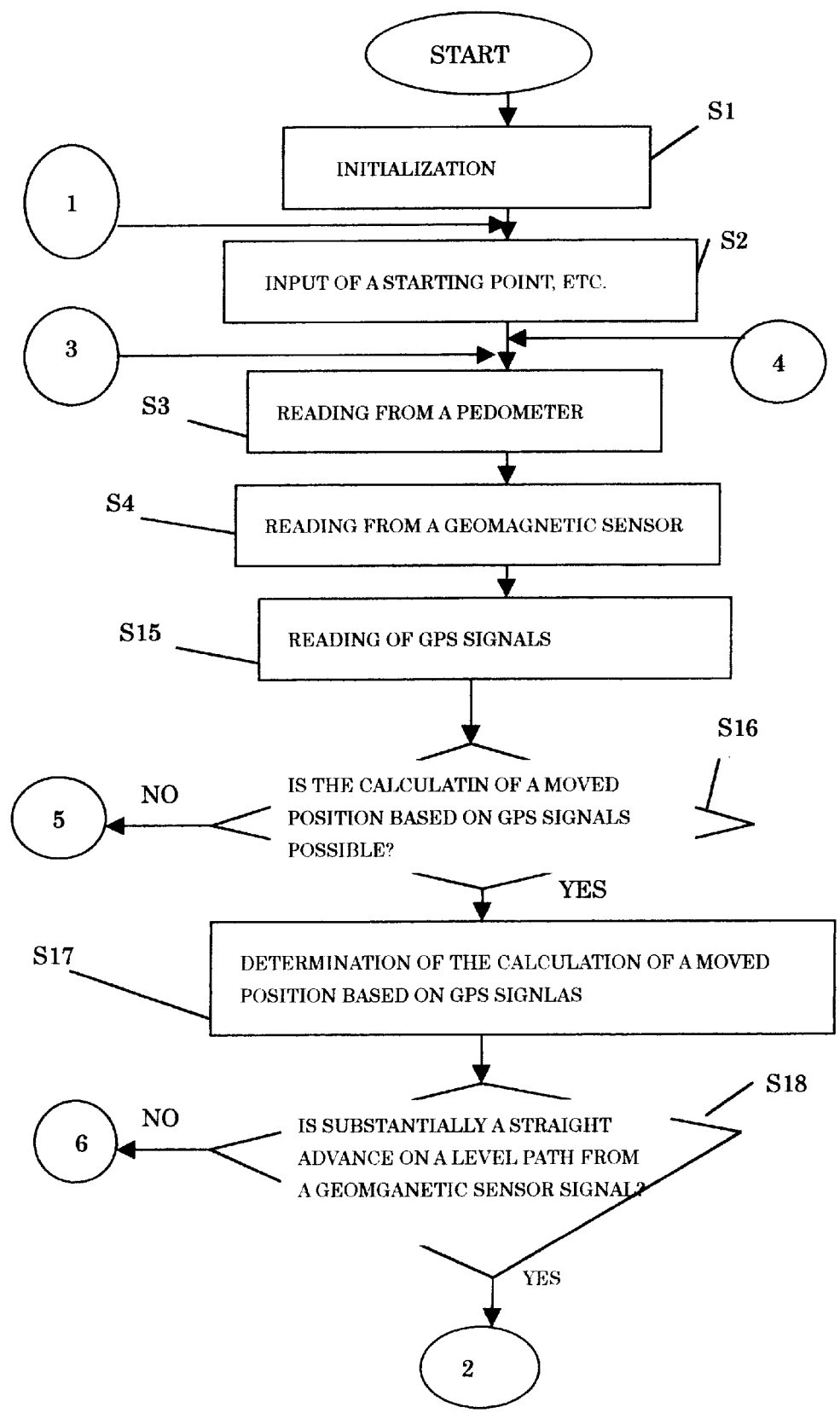
FIG. 8 is a flowchart showing the control program of the portable position detector according to the second embodiment of the present invention.
Figure 9:
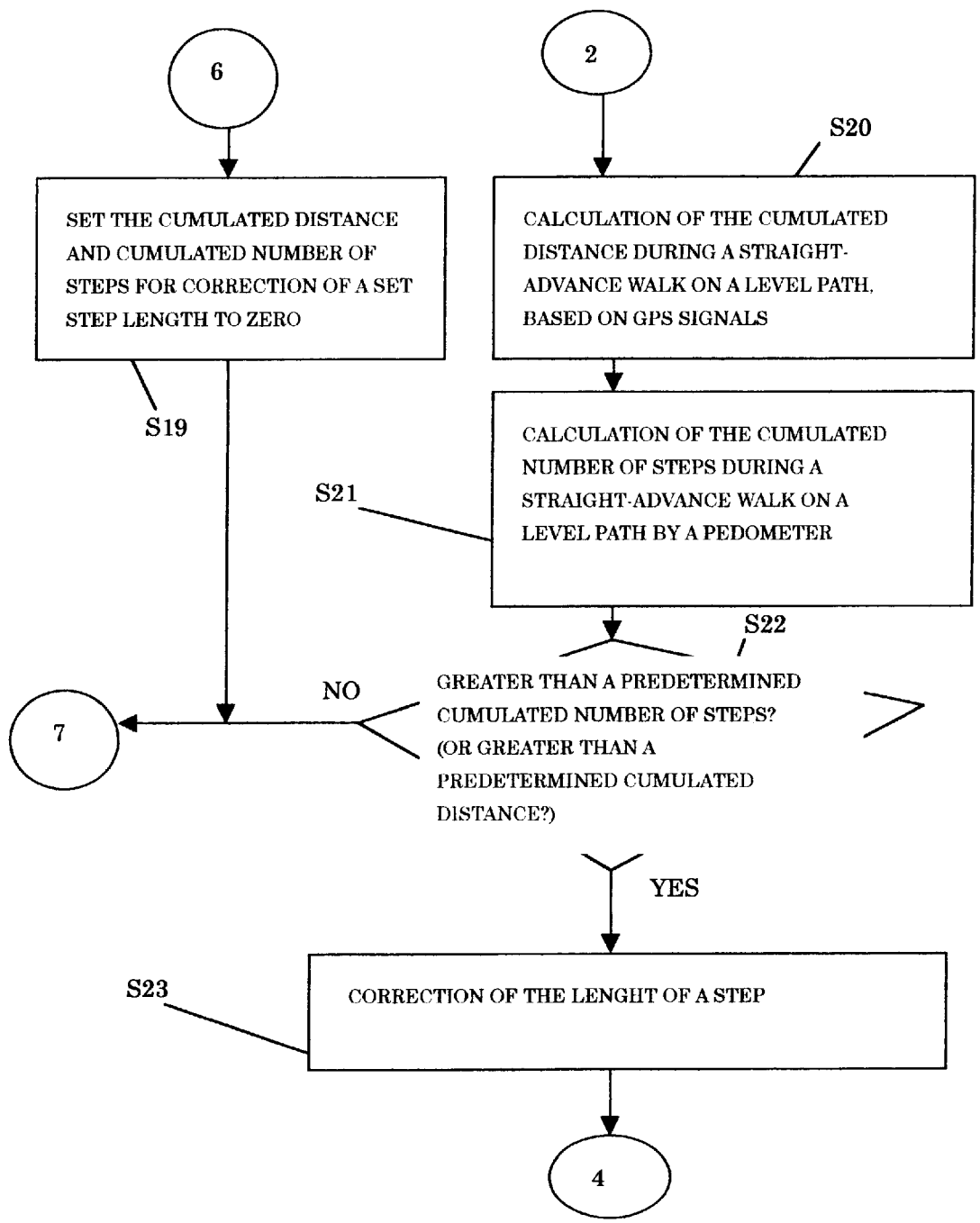
FIG. 9 is a flowchart showing the control program of the portable position detector according to the second embodiment of the present invention.
Figure 10:
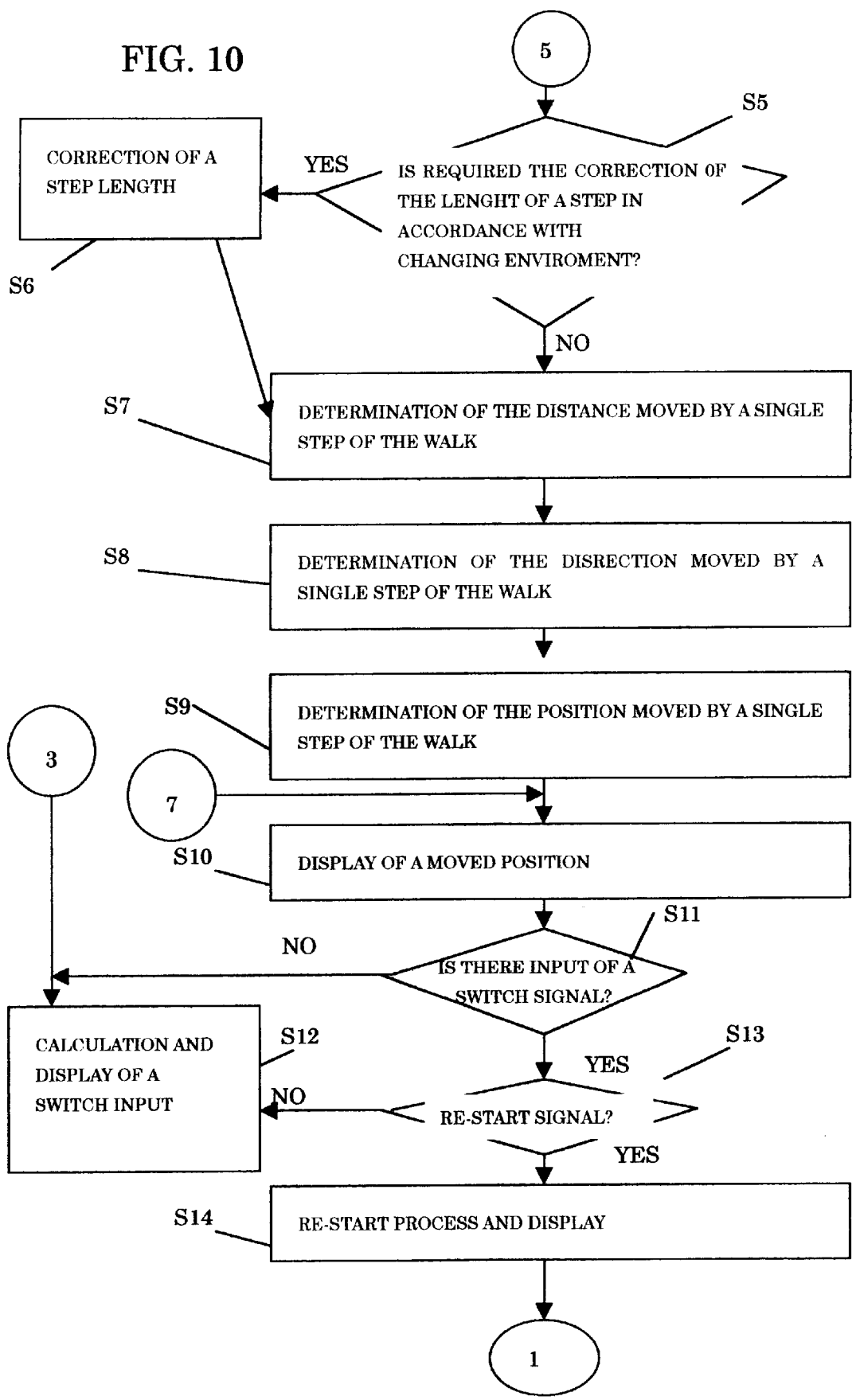
FIG. 10 is a flowchart showing the control program of the portable position detector according to the second embodiment of the present invention.

FIGS. 8 through 10 show flowcharts of the control program of the portable position detector 41, respectively. In these flowcharts, the reference numerals are applied to steps corresponding to the first embodiment and therefore a description thereof is omitted for avoiding redundancy. The step of performing a different process will hereinafter be described with a step number differing from the first embodiment.

In the control program of the second embodiment, step S15 is executed to read a GPS signal after execution of steps S1 through S4. Then, in step S16 it is judged how many GPS signals the control section 44 can receive. If the received GPS signals are 4 or more (even 3 signals are possible although accuracy is reduced), the control section 44 judges that the calculation of a moved position by GPS signals is possible and then advances to step S11. If the received GPS signals are less than that, the control section 44 judges that the measurement of a moved position based on GPS signals is impossible and then advances to step S5.

If in step S16 the control section 44 judges that the measurement of a moved position based on GPS signals is possible, in step S17 the control section 44 calculates and determines the current moved position of a person carrying this portable position detector 41 from the above-mentioned received plurality of GPS signals and advances to step S18 and steps thereafter.

However, if in step S16 the measurement of a moved position by GPS signals is judged to be impossible, in steps S5 through S9 a moved position is estimated and determined from signals output from the pedometer 12 and geomagnetic sensor 13 in the same manner as the first embodiment.

In this determination, in steps S3 and S4 the outputs from the pedometer 12 and geomagnetic sensor 13 are read in and the current position is determined based on the moved position immediately prior to the determination of the calculation impossibility in step S16, including the quantity of movement and direction obtained in steps S5 through S9.

If in step S16 the calculation based on GPS signals is judged to be possible and if in step S17 a moved position is calculated and determined based on GPS signals, in step S18 it is determined from the output signal of the geomagnetic sensor whether or not the walking is substantially "a straight advance on a level path". Note that GPS signals may be employed instead of the output signal of the geomagnetic sensor 13. The geomagnetic sensor 13 has better accuracy but is easily susceptible to surrounding metal materials. In the case of a walk on a slop or a walk on a sharp corner, i.e., in the case where it is judged that the walk is not a walk on a level path or that it is not a straight advance walk, in step S19 a cumulated moved distance for step length correction and a cumulated number of steps for step length correction are set to zero. Then, in step S10 the moved distance, determined based on the GPS signals in step S17, is displayed.

Note that the cumulated moved distance for step length correction is not a cumulated walked distance from a starting point to the current position but a cumulated distance between the start and end of a straight walk on a level path, provided for correcting a set step length.

If, on the other hand, in step S18 the control section 44 judges that the current walk is substantially a "level path" and a "straight advance walk" in which the vertical (Z-axis direction) component and the moved direction detected by the geomagnetic sensor 13 are within a predetermined length, the control section 44 advances to step S20. In step S20, the calculation of the "cumulated moved distance for a set step length" is performed with GPS signals, as long as a straight advance walk on a level path continues. Then, in step S21 the calculation of the "cumulated number of steps for a set step length" is likewise performed as long as a straight advance walk on a level path continues. In the next step S22 it is judged whether or not the aforementioned cumulated number of steps is greater than a predetermined value. Instead of this, it may be judged whether or not the aforementioned cumulated moved distance is greater than a predetermined value. In either case, if it is greater than the predetermined value, in step S23 the above-mentioned cumulated moved distance is divided by the above-mentioned cumulated number of steps to calculate the value of a "correction step length". The control section 44 replaces this value with the value of the step length input in step S2 and returns to step S3. By employing the correction step length in the calculation of a moved distance, etc., a set step length closer to the actual step length is employed in the walk thereafter. As a result, the accuracy of a moved position is enhanced. As described above, the reason why the cumulated number of steps or cumulated moved distance greater than a predetermined value is employed is for enhancing accuracy by averaging and also for reducing the influence of an GPS measurement error.

Here, steps S18 through S23 constitute the program portion of "set step-length correction means".

In the above-mentioned embodiment, while steps S15 through S23 are inserted between steps S4 and S5 in the first embodiment shown in FIG. 3, the present invention is not limited to this. For example, in FIG. 8 the control section 44 may advance from step S4 to step S5, and steps S15 through S23 maybe inserted between steps S9 and S10 of FIG. 3. In this case, the control section 44 advances from step S9 to step S15. In the case of "NO" in step S16 of FIG. 7, the control section 44 may advance to step S10.

Thus, in accordance with the portable position detector of the second embodiment, the position measurement means based on GPS signals is added in addition to the position measurement means based on the self-contained navigation system which employs the pedometer 12 and geomagnetic sensor 13 described in the first embodiment. The second embodiment is further equipped with switch means. That is, where the measurement of a position by GPS signals is possible, a position measured by GPS signals having higher accuracy is prior to a position measured by the self-contained navigation system, and the dead reckoned position is corrected. Where the measurement of a position by GPS signals is impossible, the measurement result of a moved position by the self-contained navigation system is employed. Therefore, the second embodiment can know the moved position of a walking body at any place, although it is portable. Also, even when the self-contained navigation system continues and a cumulated error becomes slightly greater, a dead reckoned position is corrected to eliminate the cumulated error at the time the measurement of a position by GPS signals has become possible. As a result, position accuracy can be enhanced.

In addition, by employing GPS signals, an average step length is calculated from the walked distance and number of steps during a straight-line walk on a level path, and a previously set step length value is corrected to correspond to the actual step length. As a result, the accuracy of the above-mentioned self-contained navigation system can be enhanced.

Now, a third embodiment of the present invention will be described.

Figure 11:
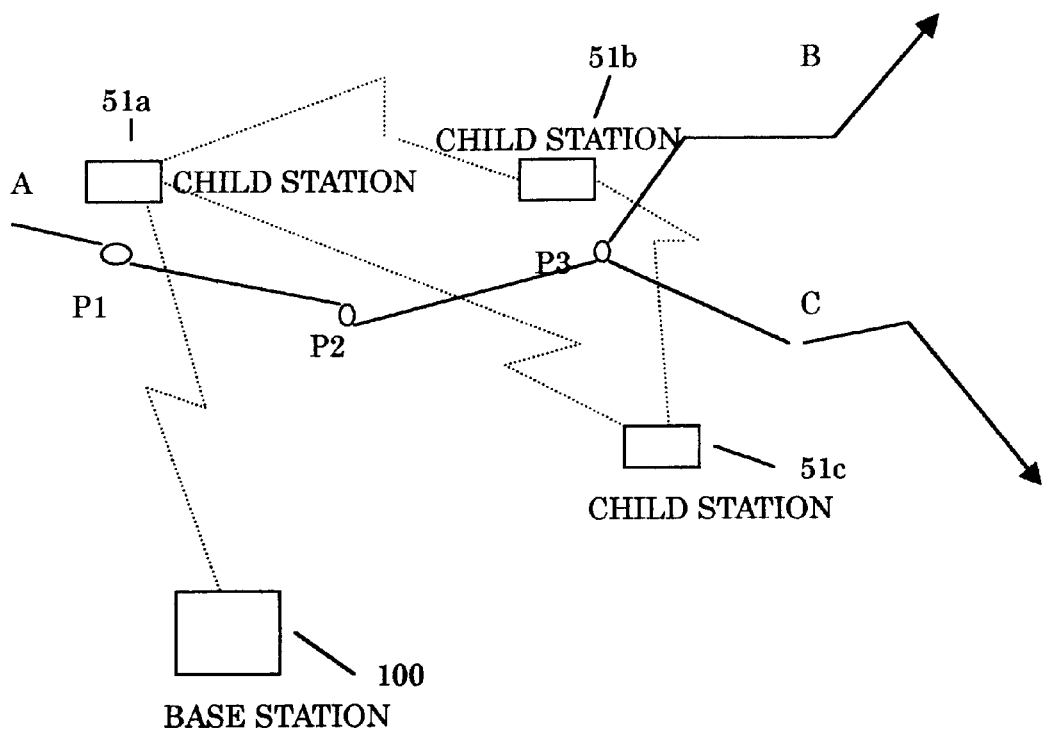
FIG. 11 is a diagram used for explaining mountaineering routes.

The third embodiment, as illustrated in FIG. 11, is applied to a system in which a base station 100 manages a plurality of portable position detectors 51a to 51c that are used as child stations in mountaineering routes. The base station 100 is constructed mainly of a personal computer. The base state 100 uses the portable position detectors 51a to 51c (hereinafter represented by 51) as child stations and manages the moved positions, moving routes, and other necessary information. It is possible to transfer information between the base station 100 and the child station by radio communication. It is also possible to transfer information between the child stations.

The portable position detector 51 is carried as a child station by a person (climber) and detects a dead reckoned position. As with the second embodiment, the portable position detector 51 makes advantage of signals from GPS satellites to correct the length of a step. Furthermore, the portable position detector 51 transmits necessary information to the base station 100 and receives correction information from the base station 100, thereby performing a moved-position detecting process.

The base station 100 has grasped the details of mountaineering routes. The base station 100 receives information from a plurality of child stations and also accurately detects their positions by taking advantage of signals from GPS satellites, thereby performing a management process necessary for movement of a child station in addition to the transmission of necessary correction information to a child station.

Figure 12:
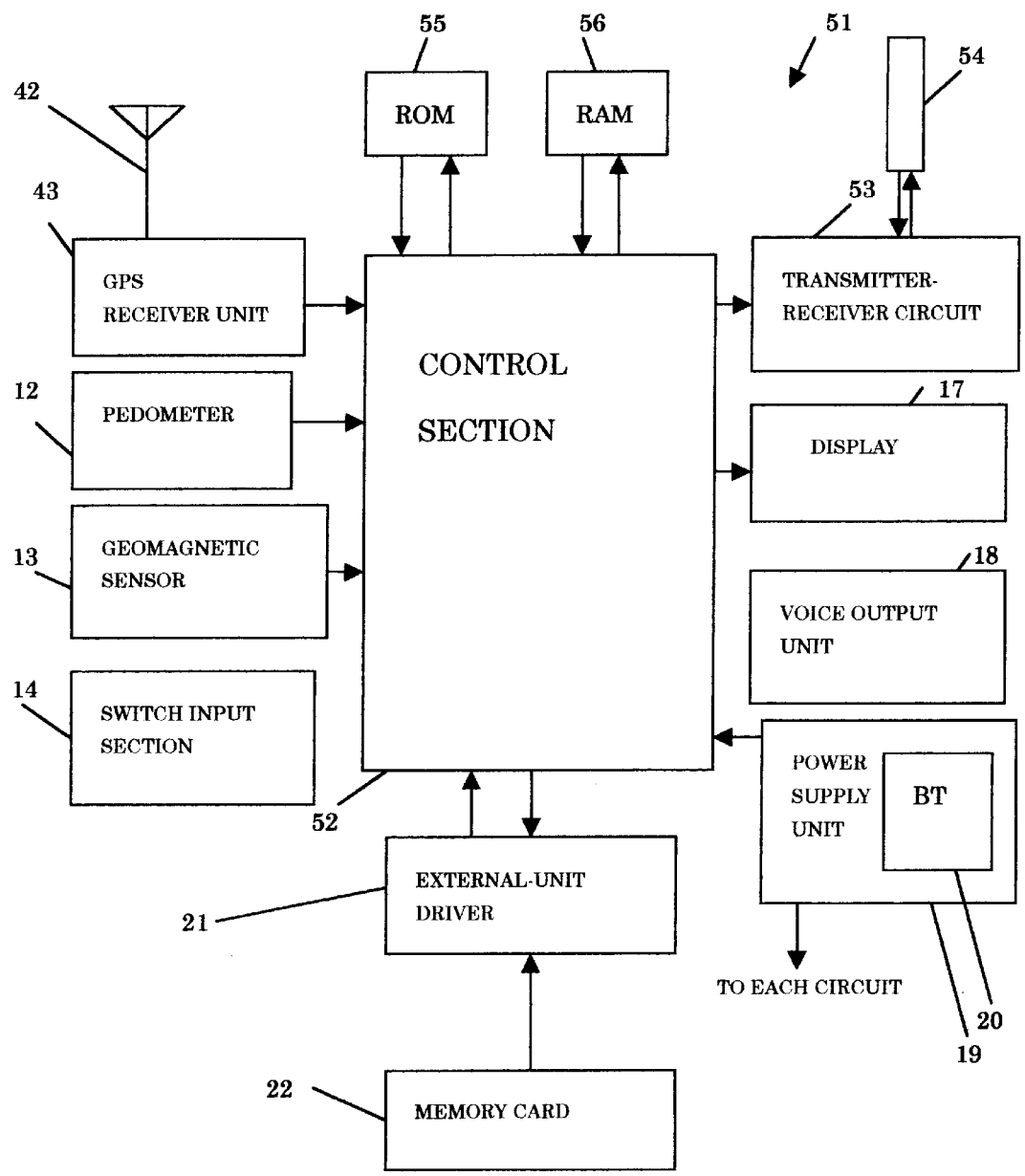
FIG. 12 is a block diagram of a portable position detector according to a third embodiment of the present invention.

Now, the construction of the portable position detector 51 as a child station will be described in reference to FIG. 12. In the figure, the portable position detector 51 differs from the second embodiment in that the contents of a control section 52 and a ROM 55 differ and that a transmitter-receiver circuit 53 and a communication antenna 54 are newly provided. The transmitter-receiver circuit 53 (transmission means and communication means) transmits information about the movement of a child station to the base station 100, also receives correction information transmitted from the base station 100, and furthermore, performs the communication of information between child stations. Note that in the communication with a child station, an ID number for identifying that child station is also transmitted. The communication antenna 54 is used when the transmitter-receiver circuit 53 transmits and receives a radio wave. While the transmitter-receiver circuit 53 uses a small radio transmitter with small power, it may be constructed, for example, of an incorporated telephone using a radio wave.

The control section 52, in addition to the processes in the second embodiment, performs a correction process in calculating the moved position of the child station based on GPS signals, based on correction information received from the base station 100. Also, the ROM 55 stores the control program of the control section 52, etc. Therefore, the control section 52, ROM 55, and RAM 16 realize the hardware portion of walking-body moved information correction means.

Figure 13:
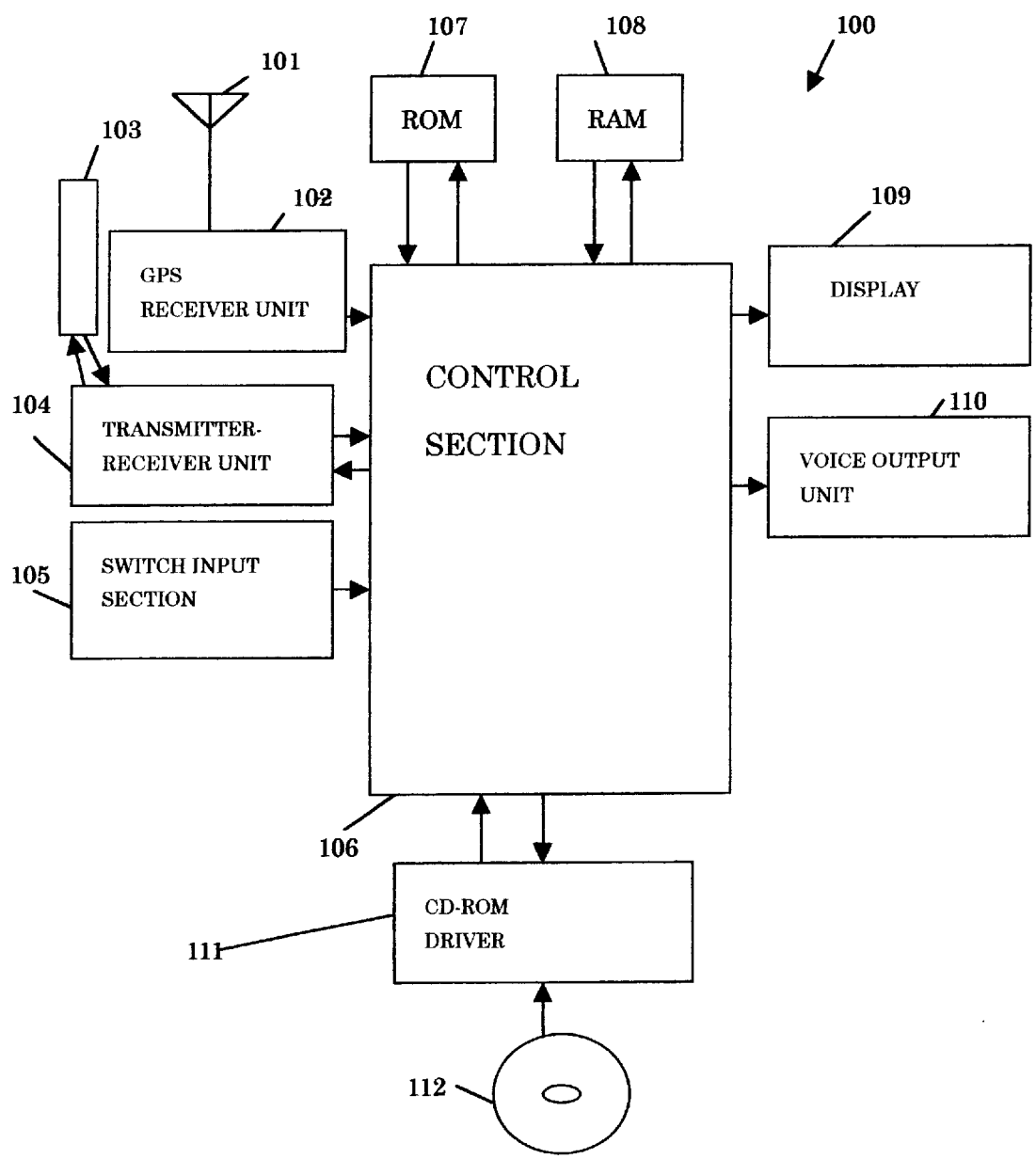
FIG. 13 is a block diagram of a base station.

Now, the construction of the base station 100 will be described in reference to FIG. 13. In the figure, the base station 100 includes a GPS antenna 101, a GPS receiver unit 102, a communication antenna 103, a transmitter-receiver unit 104, an switch input section 105, a control section 106, a ROM 107, a RAM 108, a display 109, a voice output unit 110, and a CD-ROM driver 111. The base station 100 is constructed mainly of a personal computer.

The GPS antenna 101 uses, for example, a micro strip patch antenna employing a teflon substrate and having hemispherical directivity, in order to receive a right-handed polarized wave signal of about 1.5 MHz sent from GPS satellites. The GPS antenna 101 is attached to the exterior of the main body of the base station 100. The GPS receiver unit 102 receives and modulates a radio wave for measurement from a plurality of GPS satellites via the GPS antenna 101. The GPS receiver unit 102 also calculates the current position information (e.g., three-dimensional measurement information including latitude, longitude, and altitude) of the base station 100, based on the modulated signal, and also outputs the calculated current position information to the control section 106.

The transmitter-receiver unit 104 receives child-detector information sent from a plurality of child stations through the communication antenna 103. The transmitter-receiver unit 104 also outputs the received child-detector information to the control section 106 and transmits the information of the control section 106 to the child station. The transmitter-receiver unit 104 constitutes reception means and correction-information transmission means.

In the base station 100 that has accurately known positions such as latitude, longitude, and altitude by pre-measurement, the control section 106 detects an error component from the pseudo distance, time information, and satellite orbit data sent from GPS signals. The control section 106 also displays both the position of the base station 100 and the position information received from a child station via the transmitter-receiver unit 104 onto the screen of the display 109 so that they correspond to the mountaineering-route map data read out of the CD-ROM 112 via the CD-ROM driver 111. Furthermore, the control section 106 performs a required process (e.g., setting of a mountaineering route range, setting of the relation between the ID number of a child station and position information, etc.), based on a switch manipulation signal from the switch input section 105. Moreover, the control section 106 changes the screen information of the display 109 (e.g., screen enlargement, displayed-area change, etc.) . The control section 106 performs a required voice synthesizing process (e.g., a voice-synthesized sound, "the child station started moving," is given when the child station starts moving) and outputs the result to the voice output unit 110. The control section 106 is constructed of a microcomputer including a CPU and performs the above-mentioned control in accordance with the control program stored in the ROM 107.

The switch input section 105 includes a manipulation key for performing a setting manipulation (e.g. setting of a mountaineering route range, setting of the relation between the ID number of a child station and position information, etc.). The switch input section 14 also includes a change key for changing the map information about the movement of a child station and the child-detector management information displayed on the screen of the display 109, a power key, and other keys. With the switch input section 105, the latest information, such as a dangerous area, i.e., an area in which a landslide or an avalanche is possible or has occurred, is added to the map information from the CD-ROM 112, whereby a movable area can be synthesized.

Note that a movable area (e.g., a relatively wider area including a mountaineering route and the vicinities) in which a child station may move has previously been stored in the CD-ROM 112 that is driven by the CD-ROM driver 111. The spots on the stored movable mountaineering route area can be specified, for example, with coordinates.

The ROM 107 has previously stored a program and required data for child-station control that is performed by the control section 106. The RAM 16 has a work area, a first memory area that temporarily stores information input by the switch input section 105 and a second memory area that temporarily stores information to set a retrieval range specified by manipulation of the switch input section 14.

The display 109 is constructed of a liquid crystal display (e.g., a color LCD). The display 109 superimposes and displays both the mountaineering-route position information processed by the control section 106 and the mountaineering-route map information read out by the CD-ROM 112 through the CD-ROM driver 111 onto the screen thereof. The voice output unit 110 outputs a sound, based on a voice-synthesized signal or sound effect from the control section 106, and consists, for example, of a speaker. Note that power is always supplied to the base station 100 via an indoor power supply so that the base station 100 can operate for 24 hr in principle.

The control section 106, ROM 107, and RAM 108 constitute management means and correction means. The display 109 constitutes display means.

Next, the operation of the child station will be described.

Figure 14:
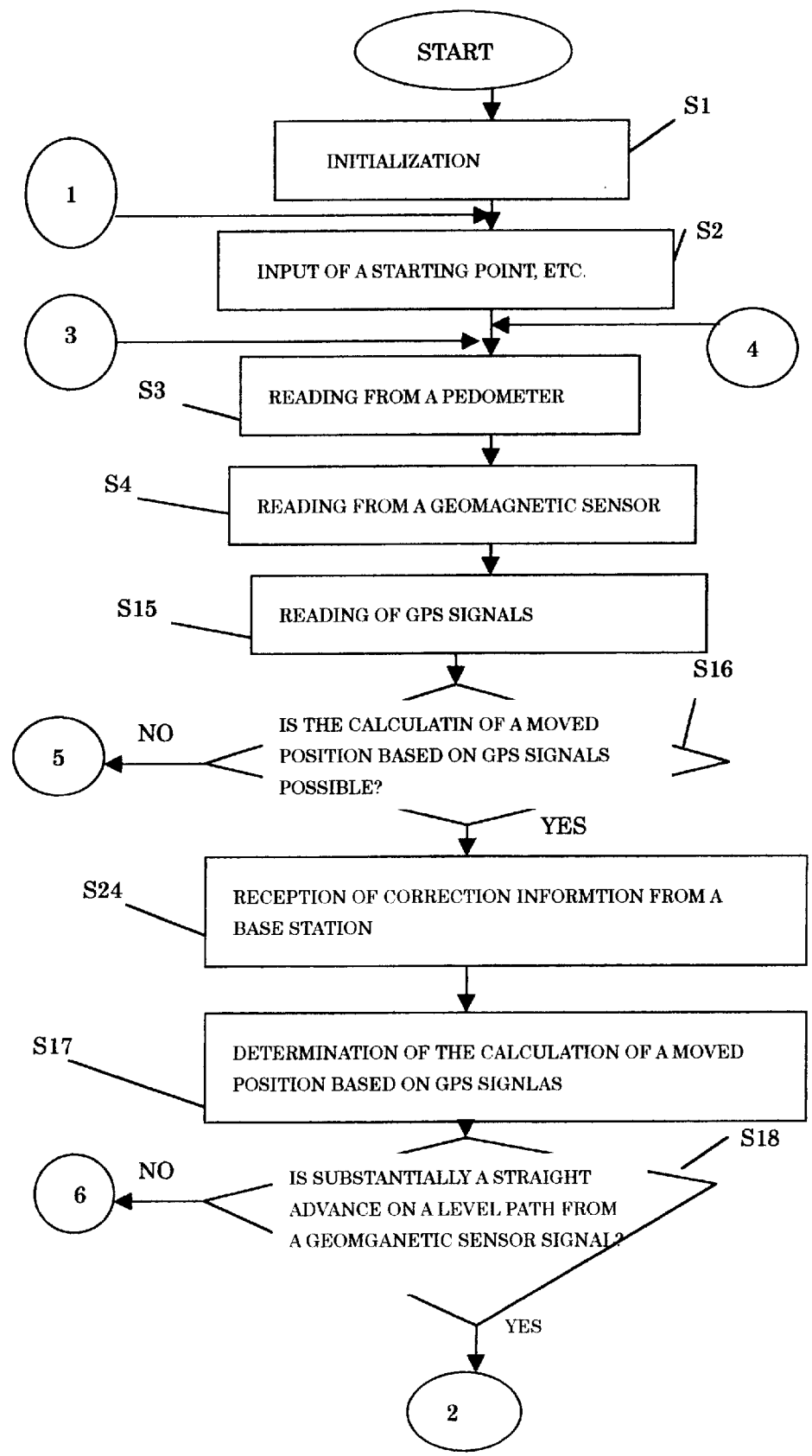
FIG. 14 is a flowchart showing the control program of the portable position detector according to the third embodiment of the present invention.
Figure 15:
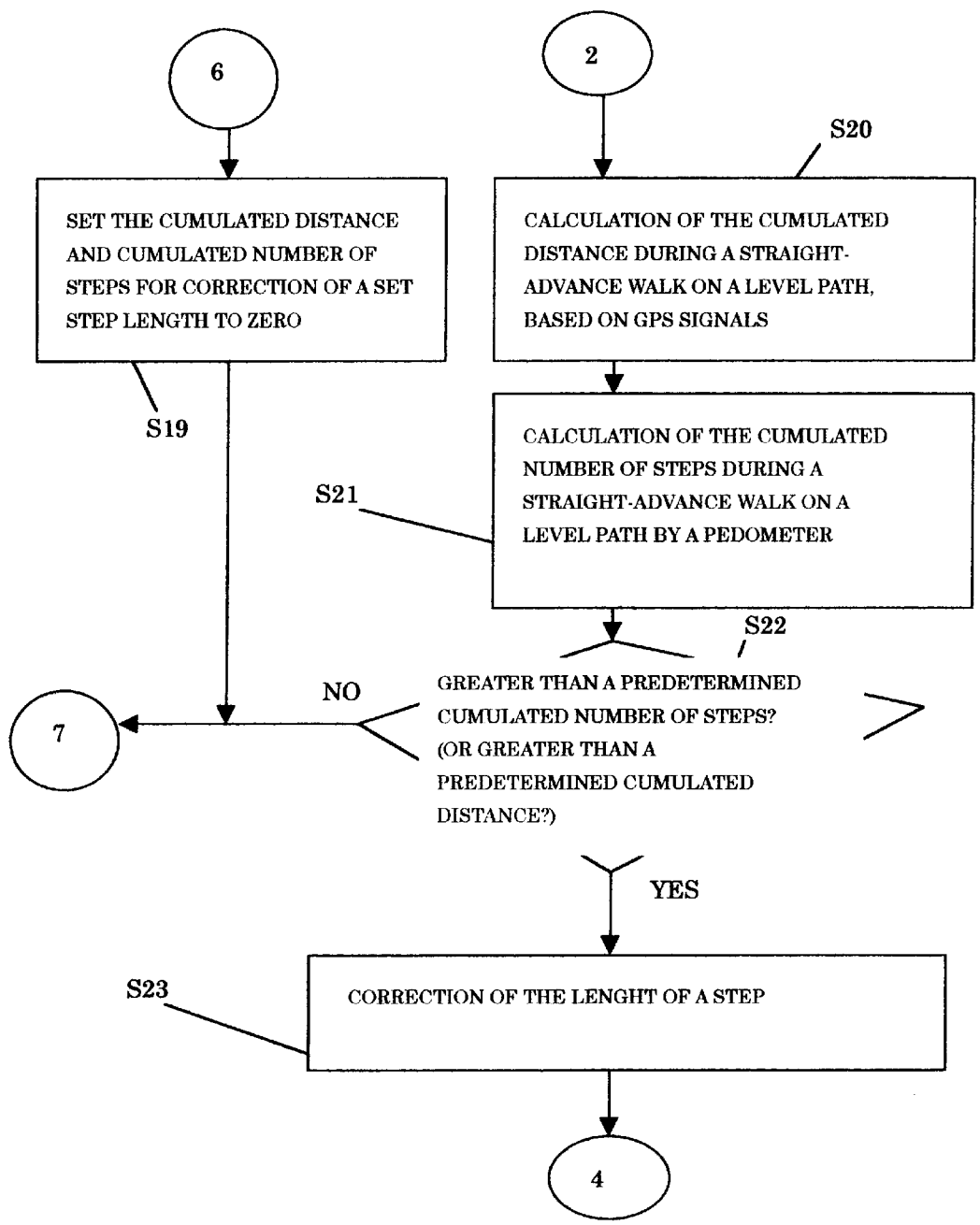
FIG. 15 is a flowchart snowing the control program of the portable position detector according to the third embodiment of the present invention.
Figure 16:
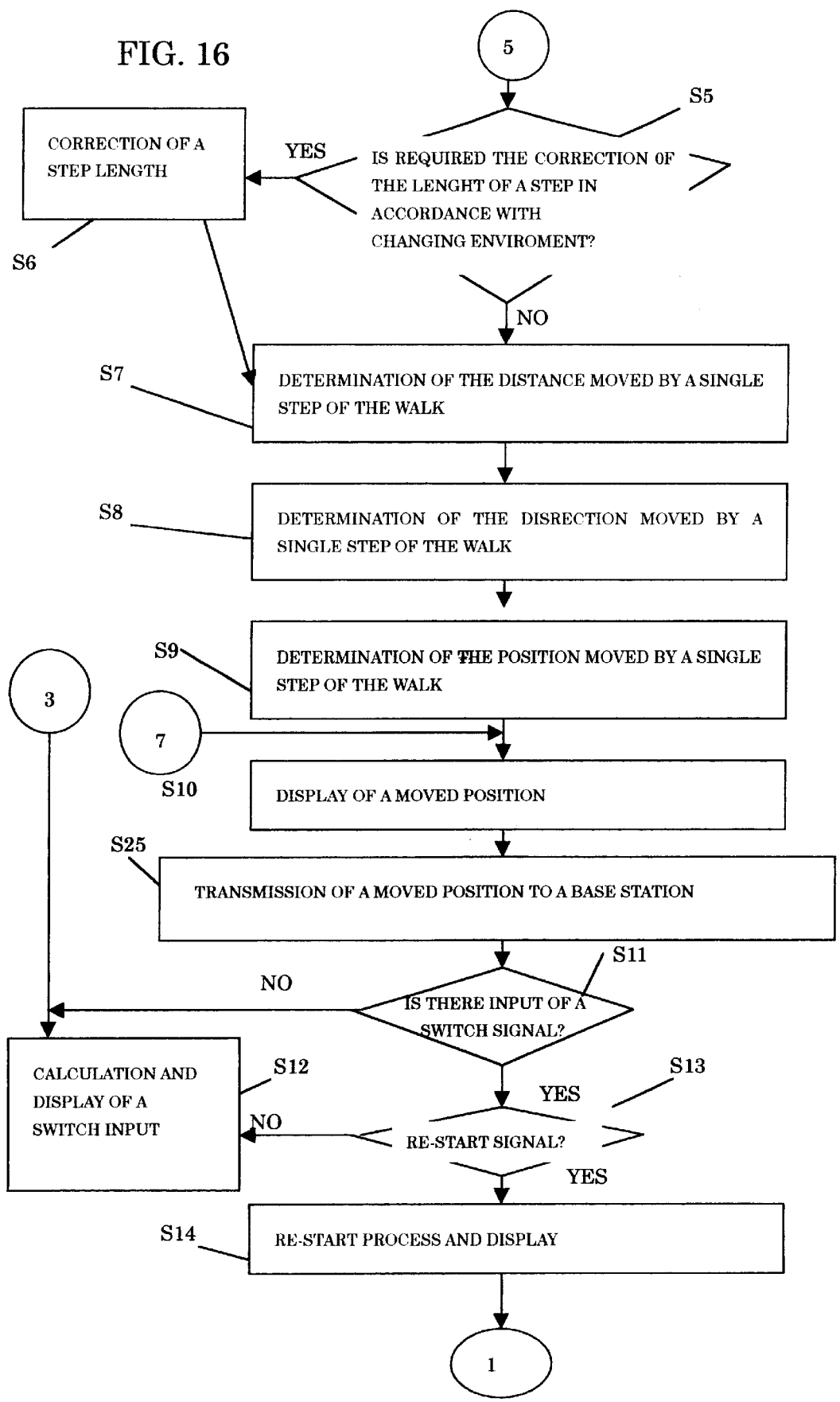
FIG. 16 is a flowchart showing the control program of the portable position detector according to the third embodiment of the present invention.

FIGS. 14 through 16 are flowcharts showing the control program of the child station, respectively. This program will be executed if power to the portable position detector 51 (child station) is turned on. In these flowcharts, the reference numerals are applied to steps corresponding to the second embodiment and therefore a description thereof is omitted for avoiding redundancy. The step of performing a different process will hereinafter be described with a step number differing from the second embodiment.

In the control program of the third embodiment, as with the program of the second embodiment, the control section 52 advances to steps S15 and S16 via steps S1~S4. In step S16, if the control section 52 judges from the number of satellites that the calculation of a moved position is-possible based on GPS signals, the control section 52 advances to step S24 added in the third embodiment. In step S24 the control section 52 receives the above-mentioned correction information of the GPS signal from the base station 100, and in step S17, the control section 52 performs the calculation and determination of a moved position based on the GPS signal, in view of the correction information. Therefore, the position information obtained in the third embodiment has a smaller error and higher accuracy than the moved position obtained in step S17 of the second embodiment.

After step S17, the control section 52, as with the second embodiment, advances to steps S18–S23 and step S10. After in step S10 a moved position has been displayed, in step S25 the control section 52 transmits the moved position of the child station (the aforementioned corrected position, or when calculation based on GPS signals is impossible, a dead reckoned position) and the information about the ID number of the child station to the base station 100. Then, the control section 52 advances to step S11. The remaining operation is the same as the second embodiment.

FIG. 17 is a flowchart showing the control program of the base station 100. This program will be executed if power to the base station 100 is turned on. If the control program starts, initialization will first be performed in step S100. In the initialization, a predetermined initialization process, such as initial resetting, the clearing of the work area of the RAM 108 and the like, is performed. In the initialization, the measurement of time is also started. Then, in step S101 an area in which the child station moves is set. This setting, as in step S104 to be described later, may be performed on the screen of the display 109 on which external storage data (map data) was displayed. In the case where a plurality of mountaineering routes have previously been set, a single mountaineering route may be selected from them.

Note that the planed routes of the child stations have previously been set and input. The "area in which the child station moves" is set for the purpose of tracking and monitoring the actual movement of the child station and obtaining information of whether the child station is departed from its own route. The latest information, such as traffic impossibility (or danger) due to an avalanche or a landslide, has also been input. In this case, the "area in which the child station moves" is set for the purpose of preventing the child station from approaching a dangerous route or avoiding a loss of time.

Next, in step S102 a GPS signal (GPS radio wave), including position information transmitted from a plurality of GPS satellites, is received. Based on the received GPS signal, the three-dimensional measurement data (i.e., latitude, longitude, and altitude) of the base station 100 are calculated to detect the current position. Then, in step S103 an error in the GPS signal is detected and corrected from the previously accurately measured position of the base station 100 and the GPS signal information. After this detection, in step S104 the base station 100 transmits information about the aforementioned error. Next, in step S105 the control section 106 of the base station 100 receives the corrected information from the child station through the transmitter-receiver unit 104. At this time, the control section 106 also receives the ID number of the child station and identifies the child station.

Next, in step S106 an external stored-data retrieving process is performed. In the external stored-data retrieving process, the map information corresponding to a mountaineering route area is retrieved and read out by the CD-ROM 112 through the CD-ROM driver 111. Then, in step 107 the map information corresponding to a mountaineering route area is displayed on the display 109.

Next, in step S108 the position of the base station 100 is displayed on the map, and in step S109 the received current position of the child station is displayed on the display 109 along with the ID number. With this, the operator of the base station 100 can confirm the current position on the map while identifying the child station. In the child-station displaying process, the voice output unit 110 may output a voice-synthesized sound (e.g., "The child station with ID No. ○○ passed now the pond on the ○○ route") so that the current position of the child station corresponding to the ID number is guided. Note that the map information is automatically switched with the movement of a child station (i.e., the map information is scrolled).

Next, in step S110, when there is additional information to a corresponding child station, the information is input. In step S11, information, such as "A child station is approaching a dangerous area", "A child station is considerably being departed from a planed route" and the like, is transmitted to a corresponding child station, as occasion demands.

In the above-mentioned third embodiment, the base station 100 can monitor a large number of child stations and can guide these child stations or cope with the emergency situation of a child station. The base station 100 can also grasp the position of a child station more accurately, because it adopts a differential method that detects error information about a GPS signal to correct the position information of the child station based on the GPS signal.

In the above-mentioned third embodiment, while a child station processes the calculation and correction for its moving position, the present invention is not limited to this. For example, a child station performs a necessary and minimum amount of processing and transmits the information to the base station 100, while the base station 100 performs the aforementioned processes and transmits the processed information to the child station. In this case the load on the child station can be reduced.

In the case where the process for obtaining information required of the child station is thus shared by the base station 100 (parent station) and the child station, it is desirable that the child station perform the self-contained navigation system process, while the base station 100 process a portion of the GPS signal process, because even when the radio communication with the base station 100 is broken off or when the position measurement based on GPS signals is impossible, the child station can know its position at all times while reducing the processing load thereon.

While the present invention has been described with reference to the preferred embodiments thereof, the invention is not to be limited to the details given herein, but may be modified in the following manner.

(a) The display may display whether the estimation of a position by the portable position detector is based on GPS signals or on the self-contained navigation system. If done in this manner, a walker (person) with the portable position detector can move while judging the accuracy of the measured position personally. When an estimated position is not based on GPS satellite signals, it may be displayed in a high-probability area along with a message that the estimated position is based on the self-contained navigation system.

(b) The walking body that carries the portable position detector is not limited to a person, but may be an animal, a bird or the like. Therefore, this portable position detector is also effective in analyzing the route moved by the above-mentioned walking body. The walking body also includes an artificial walking body such as a walking robot.

(c) The components of the present invention may be separately dispersed and disposed.

(d) While the above-mentioned embodiments use a memory card as the storage means in the portable position detector, the present invention is not limited to memory cards but may use various storage media. For instance, it may use CD-ROMs, magneto-optical disks, DVD disks, magnetic tape, minidisks, IC cards, optical cards, and so on.

(e) While the above-mentioned embodiments are separately provided with a pedometer and a geomagnetic sensor, the present invention may employ a three-dimensional geomagnetic sensor, for example. In this case, since the three-dimensional geomagnetic sensor can also function as a pedometer by a detected vertical geomagnetic change, it can remove the use of a separate pedometer. Thus, the selection of sensors may be freely performed if the objectives of the present invention can be achieved.

(f) In the above-mentioned embodiments, although the moved-direction determination means detects the highest-position arrival point and/or landed point with the geomagnetic sensor, it can also detect the points with an acceleration sensor.

(g) The substantially highest position may be evaluated anywhere between landed points.

What is claimed is:

1. A portable position detector for detecting a moved position of a walking body, comprising:

walking-motion detection means for measuring a value related to a walking motion caused by movement of said walking body;

moved-distance estimation means for estimating a moved distance, based on an output of said walking-motion detection means;

moved-direction detection means for detecting a direction of said walking body or a direction-movement caused by movement of said walking body;

moved-direction determination means for detecting points at which the body of said walking body arrives at substantially a highest position and/or lands by walking, based on said value measured by said walking-motion detection means, and also for determining a moved direction at a specific point as a specific moved direction, the specific point being related to at least one of said detected two points and also being specified in a range in which said body is between said highest-position arrival point and a highest-position arrival point that is obtained by the next walking step; and moved-position estimation means for estimating a position of said walking body after movement, based on said moved distance of said walking body estimated by said moved-distance estimation means and said specific moved direction determined by said moved-direction determination means.

2. The portable position detector as set forth in claim 1, wherein said moved-distance estimation means counts the number of steps, based on a vertical acceleration of said walking body detected by said walking-motion detection means, and also estimates a moved distance from a relation of the counted number of steps and the length of a step.

3. The portable position detector as set forth in claim 1, wherein said moved-distance estimation means counts the number of steps on the basis of a vertical geomagnetic change caused by walking of said walking body, detected by said walking-motion detection means, and also estimates a moved distance from a relation of the counted number of steps and the length of a step.

4. The portable position detector as set forth in claim 1, wherein said moved-direction determination means judges and detects said highest-position arrival point and/or said landed point from a vertical acceleration change caused by walking of said walking body, and also determines a moved direction of said walking body at a specific point as a specific moved direction, the specific point being at least one of said two points, or being a point delayed from said one point by a predetermined time period.

5. The portable position detector as set forth in claim 1, wherein said moved-direction determination means judges and detects said highest-position arrival point and/or said landed point from said vertical geomagnetic change caused by walking of said walking body, and also determines a moved direction of said walking body at a specific point as a specific moved direction, the specific point being at least one of said two points, or being a point delayed from said one point by a predetermined time period.

6. The portable position detector as set forth in claim 4, wherein said predetermined time period that is delayed by said moved-direction determination means is determined as a proportional portion of a walking step period from a walking cycle.

7. The portable position detector as set forth in claim 4, wherein said predetermined time period that is delayed by said moved-direction determination means is set to a time period during which said specific point goes to a state in which a landed foot and the next foot are positioned side by side.

8. The portable position detector as set forth in claim 2, wherein said moved-distance estimation means detects changing environment from acceleration change or geomagnetic change caused by movement of said body, also changes said length of a step, based on the detected changing environment, and calculates said estimated distance.

9. The portable position detector as set forth in claim 8, wherein correction of said step length is performed by making said step length shorter than a step length during a walk on a level path, when it is judged by the detection of said changing environment that a walking path has a slope greater than a predetermined value.

10. The portable position detector as set forth in claim 1, further comprising:

a unit for receiving radio waves from global positioning system (GPS) satellites and measuring the current position of said walking body; and position correction means for correcting the current position estimated by said position estimation means, when the current position is measured with said unit.

11. The portable position detector as set forth in claim 10, wherein when the moved direction detected by said moved-direction detection means or said specific moved direction determined by said moved-direction determination means is within a predetermined direction width and also when it is judged by the detection of said changing environment that the cumulated number of steps or the cumulated moved-distance, in which a vertical amount of movement is within a predetermined width, is a straight-advance walk on a level path which continues for a predetermined Lime period or more, the correction of the length of a step in said moved-distance estimation means is performed by a value obtained by dividing a calculated distance by said cumulated number of steps, the calculated distance being calculated from both a starting point of said straight-advance walk on a level path and the current position at an end point of said walk measured by said unit.

12. A position management system comprising:

a portable position detector for detecting a moved position of a walking body, the portable position detector including (1) walking-motion detection means for measuring a value related to a walking motion caused by movement of said walking body, (2) moved-distance estimation means for estimating a moved distance, based on an output of said walking-motion detection means, (3) moved-direction detection means for detecting a direction of said walking body or a direction of said movement caused by movement of walking of said walking body, (4) moved-direction determination means for detecting points at which the body of said walking body arrives at substantially a highest position and/or lands by walking based on said value measured by said walking-motion detection means, and also for determining a moved direction at a specific point as a specific moved direction, the specific point being related to at least one of said detected two points and also being specified in a range in which said body is between said highest-position arrival point and a highest-position arrival point that is obtained by the next walking step, (5) moved-position estimation means for estimating a position of said walking body after movement, based on said moved distance of said walking body estimated by said moved-distance estimation means and said specific moved direction determined by said moved-direction determination means, and (6) transmission means for transmitting at least one piece of information of output information from said walking-motion detection means, from said moved-distance estimation means, from said moved-direction determination means, and from said moved-position estimation means; and a base station including (1) reception means for receiving the output information transmitted by said transmission means of said portable position detector and (2) display means for displaying a moved position of said portable position detector, based on the information from said reception means.

13. The position management system as set forth in claim 12, wherein at least a portion of information necessary for a process of calculating a position of said portable position detector on the basis of a GPS signal received by said portable position detector is transmitted from said portable position detector to said base station;

said base station receives said portion of information and calculates said position; and in said portable position detector, a calculation process is shared with said portable position detector and said base station so that said base station executes processes other than said position calculation process.

* * * * *